(12) United States Patent
Thubert et al.

(10) Patent No.: US 9,883,507 B2
(45) Date of Patent: *Jan. 30, 2018

(54) TIMESLOT DISTRIBUTION IN A DISTRIBUTED ROUTING PROTOCOL FOR DETERMINISTIC WIRELESS NETWORKS

(71) Applicant: Cisco Technology, Inc., San Jose, CA (US)

(72) Inventors: Pascal Thubert, La Colle sur Loup (FR); Jean-Philippe Vasseur, Saint Martin D'uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,945

(22) Filed: Oct. 27, 2016

(65) Prior Publication Data
US 2017/0048853 A1 Feb. 16, 2017

Related U.S. Application Data

(63) Continuation of application No. 14/272,999, filed on May 8, 2014, now Pat. No. 9,510,347.

(51) Int. Cl.
*H04J 3/00* (2006.01)
*H04W 72/04* (2009.01)
(Continued)

(52) U.S. Cl.
CPC ....... *H04W 72/0446* (2013.01); *H04L 45/121* (2013.01); *H04L 45/122* (2013.01);
(Continued)

(58) Field of Classification Search
None
See application file for complete search history.

(56) References Cited

U.S. PATENT DOCUMENTS 7,860,025 B2 12/2010 Thubert et al.
8,363,662 B2 1/2013 Thubert et al.
(Continued)

FOREIGN PATENT DOCUMENTS

WO 2009025181 A1 2/2009

OTHER PUBLICATIONS

International Search Report and Written Opinion dated Jul. 8, 2015 in connection with PCT/US2015/028126.
(Continued)

*Primary Examiner* — Kibrom T Hailu
(74) *Attorney, Agent, or Firm* — Parker Ibrahim & Berg LLC; James M. Behmke; Stephen D. LeBarron

(57) ABSTRACT

In one embodiment, a particular node operates a distributed routing protocol in a shared-media communication network, and distributes timeslot allocations using the routing protocol, where the particular node as a parent node allocates a pool of timeslots available to child nodes of the parent node. The parent node specifically allocates particular timeslots from the pool to particular child nodes according to particular flows from a source to a target in the shared-media communication network in order to meet a defined time budget for a resultant time-synchronized path from the source to the target.

20 Claims, 32 Drawing Sheets

(51) Int. Cl.
*H04W 72/08* (2009.01)
*H04W 40/22* (2009.01)
*H04L 12/727* (2013.01)
*H04L 12/753* (2013.01)
*H04L 12/733* (2013.01)
*H04W 28/04* (2009.01)

(52) U.S. Cl.
CPC ............ *H04L 45/48* (2013.01); *H04W 28/044* (2013.01); *H04W 40/22* (2013.01); *H04W 72/082* (2013.01); *Y02B 60/50* (2013.01)

(56) References Cited

U.S. PATENT DOCUMENTS

| | | | |
|---|---|---|---|
| 2004/0047473 A1* | 3/2004 | Fredriksson | G05B 15/02 380/278 |
| 2006/0245440 A1* | 11/2006 | Mizukoshi | H04W 16/14 370/400 |
| 2007/0104215 A1* | 5/2007 | Wang | H04L 12/5695 370/458 |
| 2007/0110102 A1 | 5/2007 | Yagyuu et al. | |
| 2008/0080460 A1 | 4/2008 | Ramkumar et al. | |
| 2008/0232334 A1* | 9/2008 | Das | H04W 48/08 370/337 |
| 2008/0232345 A1* | 9/2008 | Espina | H04W 16/14 370/350 |
| 2011/0164527 A1* | 7/2011 | Mishra | H04L 45/123 370/252 |
| 2012/0300668 A1 | 11/2012 | Thubert et al. | |
| 2013/0022042 A1* | 1/2013 | Vasseur | H04L 45/121 370/389 |
| 2014/0122741 A1 | 5/2014 | Thubert et al. | |
| 2014/0126575 A1 | 5/2014 | Janneteau et al. | |
| 2014/0155098 A1* | 6/2014 | Markham | H04B 1/0064 455/456.3 |
| 2015/0049664 A1* | 2/2015 | Gora | H04W 84/047 370/315 |

OTHER PUBLICATIONS

Farrel et al., "A Path Computation Element (PCE)-Based Architecture", the Internet Society, Network Working Group, Request for Comments 4655, Aug. 2006, 41 pages.
Gnawali et al., "The Minimum Rank with Hysteresis Objective Function", Request for Comments 6719, Sep. 2012, 13 pages, Internet Engineering Task Force Trust.
Thubert et al., "Objective Function Zero for the Routing Protocol for Low-Power and Lossy Networks (RPL)", Request for Comments 6552, Mar. 2012, 14 pages, Internet Engineering Task Force Trust.
Vasseur et al., "Path Computation Element (PCE) Communication Protocol (PCEP)", IETF Trust, Networking Working Group, Request for Comments 5440, Mar. 2009, 87 pages.
Vasseur et al., "Routing Metrics Used for Path Calculation in Low-Power and Lossy Networks", Request for Comments 6551, Mar. 2012, 30 pages, Internet Engineering Task Force Trust.
Winter et al., "RPL:IPv6 Routing Protocol for Low-Power and Lossy Networks", Request for Comments 6550, Mar. 2012, 157 pages, Internet Engineering Task Force Trust.

* cited by examiner

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|
|   | R |   | R |   | R |   | R |   | R |   | R |   | R |   | R |   | R |   | R |   | R |   | R |   | R |
|   |   | 1 |   |   | 1 |   |   | 1 |   |   | 1 |   |   | 1 |   |   | 1 |   |   | 1 |   |   | 1 |   |   |
|   |   |   |   | 2 |   |   |   |   | 2 |   |   |   |   | 2 |   |   |   |   | 2 |   |   |   |   | 2 |   |
|   |   |   |   |   |   | 3 |   |   |   |   |   |   | 3 |   |   |   |   |   |   | 3 |   |   |   |   |   |
|   |   |   |   |   |   |   |   |   |   | 4 |   |   |   |   |   |   |   |   |   |   | 4 |   |   |   |   |
|   |   |   |   |   |   |   |   |   |   |   |   | 5 |   |   |   |   |   |   |   |   |   |   |   |   | 5 |
|   |   |   |   |   |   |   |   |   |   |   |   |   |   |   |   | 6 |   |   |   |   |   |   |   |   |   |
|   |   |   |   |   |   |   |   |   |   |   |   |   |   |   |   |   |   | 7 |   |   |   |   |   |   |   |
|   |   |   |   |   |   |   |   |   |   |   |   |   |   |   |   |   |   |   |   |   |   | 8 |   |   |   |

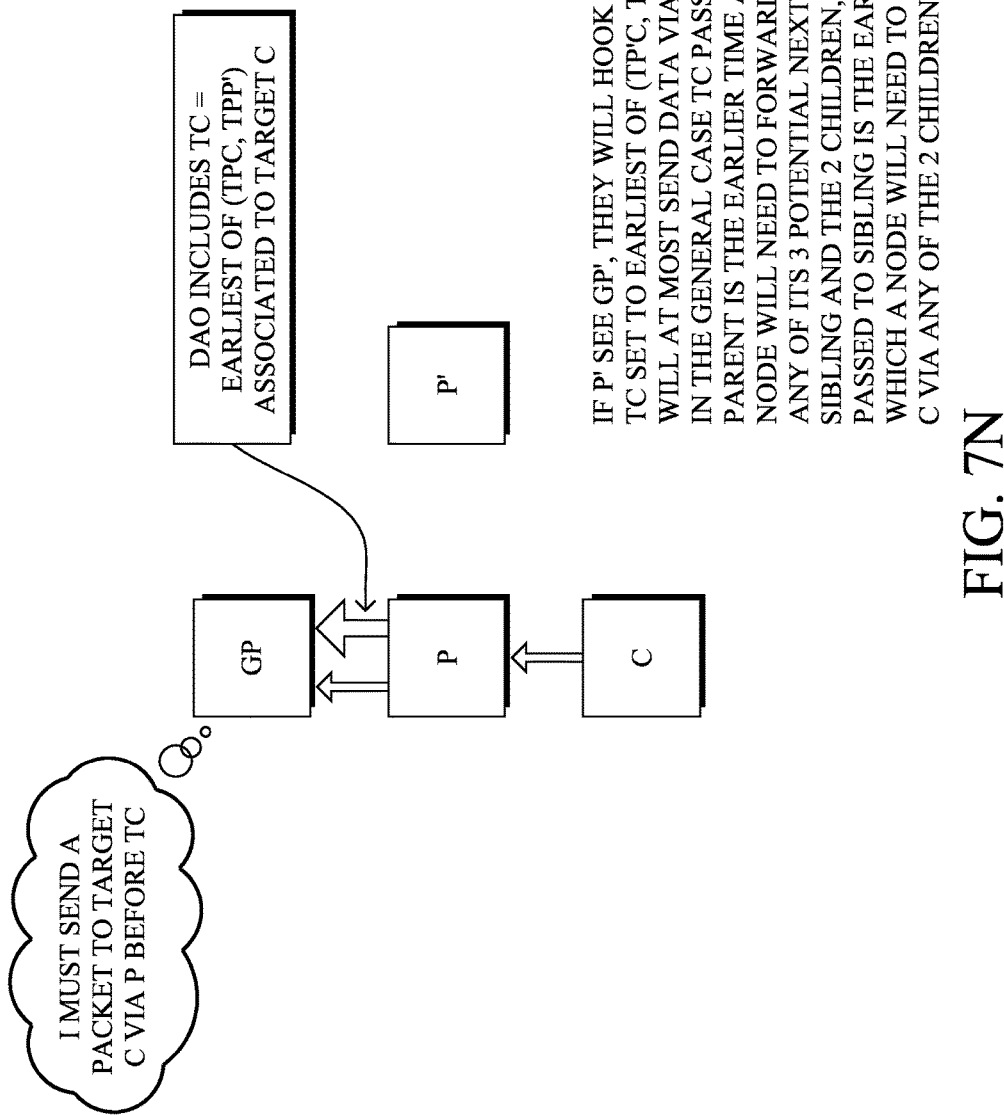

TIMESLOT DISTRIBUTION IN A DISTRIBUTED ROUTING PROTOCOL FOR DETERMINISTIC WIRELESS NETWORKS

RELATED APPLICATION

The present application is a Continuation Application of U.S. patent application Ser. No. 14/272,999, filed May 8, 2014, entitled TIMESLOT DISTRIBUTION IN A DISTRIBUTED ROUTING PROTOCOL FOR DETERMINISTIC WIRELESS NETWORKS, by Pascal Thubert et al., the contents of which is hereby incorporated by reference.

TECHNICAL FIELD

The present disclosure relates generally to computer networks, and, more particularly, to timeslot distribution in a distributed routing protocol, especially for deterministic wireless networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc.

As more and more uses for LLNs are being deployed, such as in the industrial space, determinism of the network communications and their standardization is becoming a primary point of focus within the networking community. In particular, deterministic networking refers to networks that can guarantee the delivery of packets within a bounded time. Generally, this relates to achieving characteristics such as guaranteed delivery, fixed latency, and jitter close to zero (e.g., micro seconds to tens of milliseconds depending on application). Achieving these characteristics within the architecture of an LLN, however, is not trivial, due to the constrained nature of LLNs.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example of timeslot allocation;

DESCRIPTION OF EXAMPLE EMBODIMENTS

Overview

Figure 1:
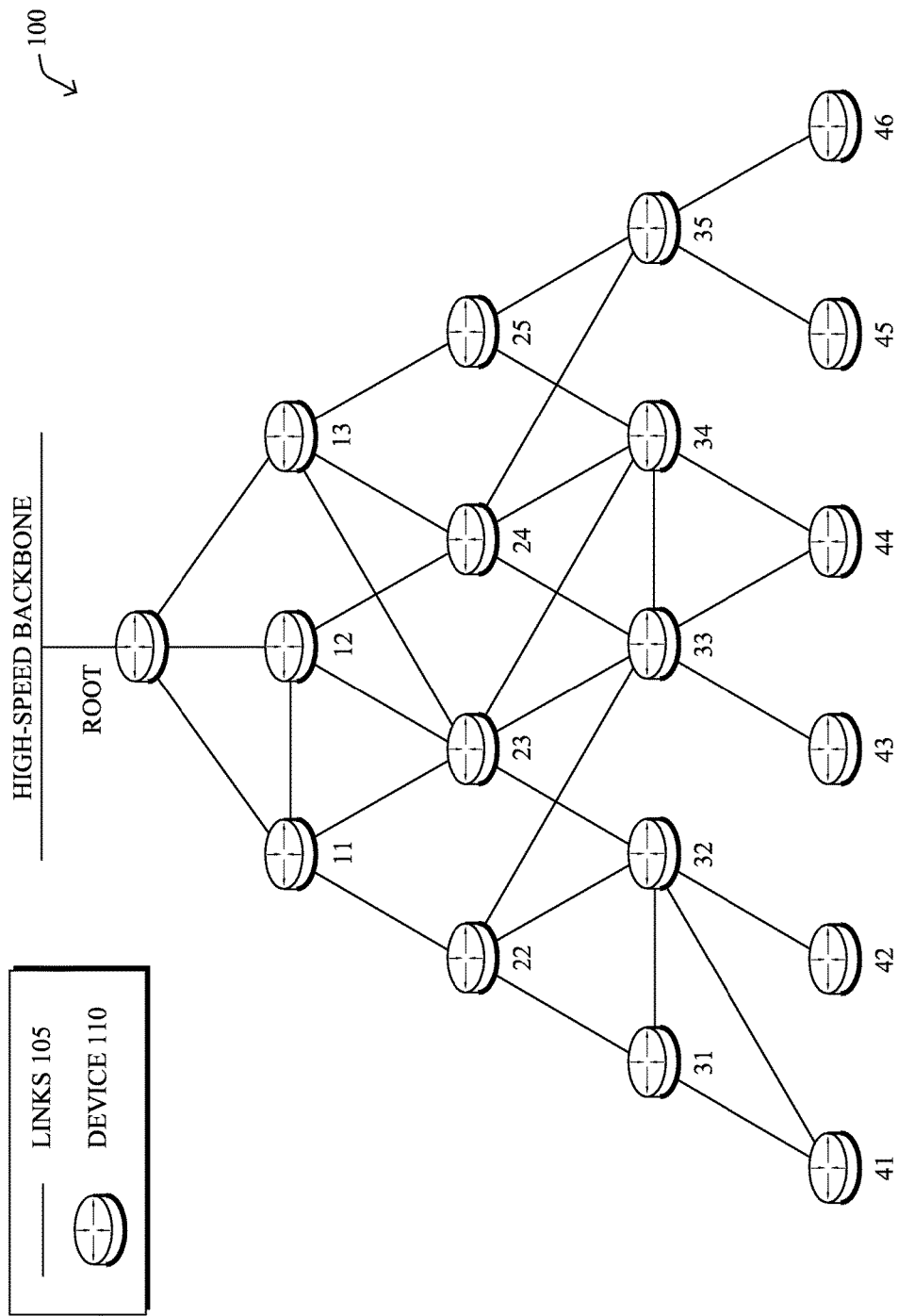
FIG. 1 illustrates an example communication network.

According to one or more embodiments of the disclosure, a particular node operates a distributed routing protocol in a shared-media communication network, and distributes timeslot allocations using the routing protocol, where the particular node as a parent node allocates a pool of timeslots available to child nodes of the parent node. The parent node specifically allocates particular timeslots from the pool to particular child nodes according to particular flows from a source to a target in the shared-media communication network in order to meet a defined time budget for a resultant time-synchronized path from the source to the target.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "backbone," "11," "12," . . . "46," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. Also, as shown, the backbone devices may connect the nodes of the network to a backbone network, such as via a dedicated wireless link or wired connection, where the backbone network may be proprietary and/or public (e.g., the Internet), and may contain various resources such as servers, switches, routers, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" backbone node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
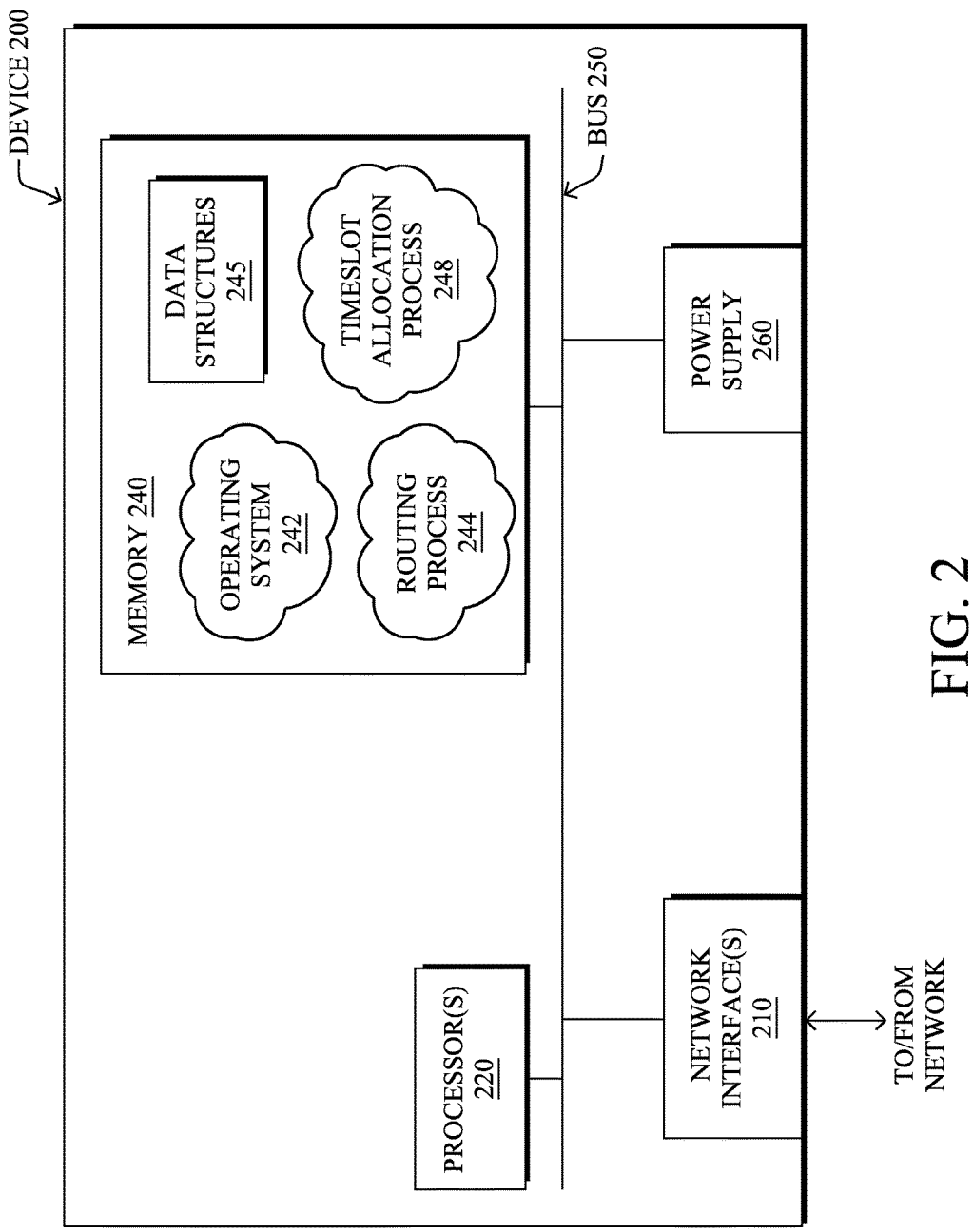
FIG. 2 illustrates an example network device/node.

FIG. 2 is a schematic block diagram of an example node/device 200 that may be used with one or more embodiments described herein, e.g., as any of the nodes 110 (e.g., root node and network nodes) shown in FIG. 1 above. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative timeslot allocation process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive (or reactive) routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" (or "Internet of Everything") network. Loosely, the term "Internet of Things" or "IoT" (or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
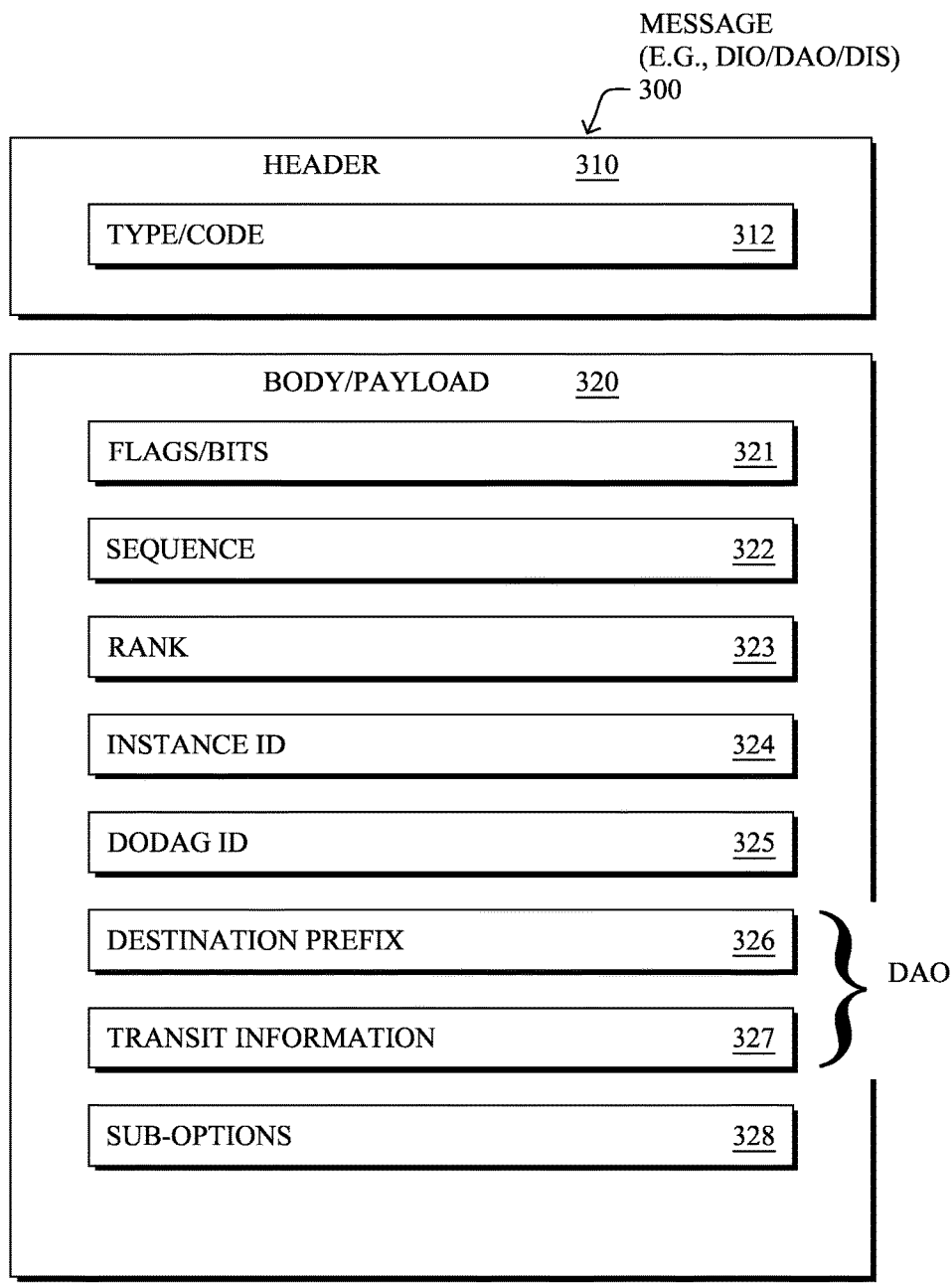
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Notably, industrial communication systems deployed today mostly use serial communications (most of them being proprietary) between sensors/actuators and a Programmable Logic Controller. Ethernet communication is also widely used for process and discrete manufacturing. For example, many SCADA (supervisory control and data acquisition) systems use Ethernet communication technologies to communicate with the Programmable Logic Controllers.

Recently with the emergence of new wireless technologies like IEEE 802.11, IEEE 802.15.4, it is becoming increasingly efficient and easy to deploy new sensors/actuators on a factory assembly line at a very low cost (e.g., no need to add wire/cable, no wire cuts, etc.), and to deploy new monitoring applications in an economically viable fashion (e.g., vents, corrosion), adding new capabilities such as automated matching flow meters along a pipe for leak detection, or lighting based on human presence for power saving, as well as allowing for applications with rotating devices, moving cranes, robots arms, or mobile handheld devices. Monitoring applications represent orders of magnitude more sensors than traditional control loops and the number of new wireless connected device deployments is growing exponentially. These new technologies have gained in robustness, stability, and security, making these deployments feasible.

However, customer requirements in the industrial space are focusing on the determinism of the network communications and their standardization, particularly since industrial networking generally requires having predictable communications between devices (e.g., a refinery's processing controls), as well as other applications, such as inflight control systems, internal vehicle connectivity, and so on. As noted above, deterministic networking refers to networks that can guarantee the delivery of packets within a bounded time. This generally translates to the following characteristics:

Guarantee of delivery;
Fixed latency; and
Jitter close to zero (micro seconds to 10s of milliseconds depending on application).

Typically, two methods are used to meet these requirements:
Quality of Service (QOS) and 802.1Q mechanisms; and
Time scheduled mechanisms.

Both methods may be used for Ethernet or Wireless technologies. There are also techniques that combine QOS technologies with time schedules (e.g., emissions of packets on the different QOS queues being triggered by a schedule-based gate mechanism). Achieving these characteristics within the architecture of an LLN, however, is not trivial, due to the constrained nature of LLNs.

In an example embodiment, Deterministic Ethernet or Deterministic Wireless based on time-scheduled mechanisms require that all the nodes being part of a path are to be time synchronized. Each packet forwarding is then regulated by a time schedule that specifies when this specific packet has to be transmitted to the wire or the radio and this continues for each node on the path. This specific time period is called a time slot. An external box (called orchestrator) usually does the computation of this path and the associated timetable. When the computation is done, the path and the time table is then pushed to every node participating in the forwarding, such that they can receive and transmit the packet according to the schedule. In the case of Deterministic Wireless, many systems used channel-hopping functionality, and the timetable in this case should define the time slot and the frequency channel to use. Illustratively, for the 802.15.4 protocol, a specific extension to the standard has been defined: 802.15.4e "Time Slotted Channel Hopping" (TSCH). TSCH is a medium access technique, which uses time synchronization to achieve ultra-low-power operation and channel hopping to enable high reliability. The Time-Slotted aspect of the TSCH technology is a Time Division Multiplexing (TDM) technique, which requires all nodes in the network to be time synchronized. Time is sliced up into time slots, which are long enough for a MAC frame of maximum size to be sent from mote (node) B to mote A, and for mote A to reply with an acknowledgment (ACK) frame indicating successful reception.

In addition, path computation elements (PCEs), as defined, for example, in the Internet Engineering Task Force's Request for Comment (RFC) 4655, generally consist of relying on an external engine (PCE) responsible for the computation of paths or tunnels in the network (e.g., a computational entity that can be hosted on a router or external server). Head-ends (or Path Computation Clients—PCCs) may send requests to PCEs (PCReq messages) using a PCEP signaling protocol (RFC 5440), and receive computed paths thanks to replies (PCRep messages). PCEP supports a variety of complex messages with priority, attributes, constraints, etc., along with IGP-based PCE discovery using OSPF and ISIS of static and dynamic attributes. Various algorithms (usually not standardized) have been specified for PCE selection and load balancing. Two forms of PCE exist: (1) Stateless (computation of paths/tunnels is memory-less and the PCE does not maintain LSP states but simply the TED (Traffic Engineering Database) for the majority of the cases; and (2) stateful where the PCE also maintains the LSP's state, which provides more optimum path computation (avoiding double booking allocation, allowing for global optimization, etc.) at the cost of additional complexity. Inter-PCE path computation has also been specified to handle the case where a single PCE would not have complete visibility of the routing domain, thus requiring some form of collaboration between PCEs to compute a path/tunnel, while preserving confidentiality between routing domains.

Notably, the PCE has generally been specified for high-bandwidth networks, such as core service provider networks. As such, PCE protocols and various mechanisms (e.g., signaling required for PCE discovery, PCC-PCE signaling protocols such as PCEP, etc.) have typically been quite heavy in terms of control plane overhead and various state maintenance. Although the overall architecture is preserved, the use of a PCE-based architecture for Deterministic Wireless requires a number of enhancements, such as new protocols and algorithms and mechanisms to operate in the highly constrained environments of LLNs, as discussed above. Furthermore the PCE has been designed to compute paths, though in the context of Deterministic Wireless, what is required is not only to compute paths, but also time slot allocation (in others words, knowing the traffic matrix, paths, and time slot allocation is intimately coupled, which changes the paradigm of routing and network operations, introducing new issues that require new mechanisms).

Timeslot Allocation

"Live-live" for time sensitive flows requires the establishment of (usually 2) node-disjoint (i.e., non-congruent) paths from one (or more) sources to a particular target destination. Live-live improves the reliability of the delivery with a minimum jitter: for example, a same message stream can be injected along both primary and backup paths so a loss or a breakage along one path does not prevent the reception of the message stream within acceptable latency. An alternate use is when only one path is live with data and the other is in hot standby, ready to take over.

Wireless Deterministic Networking takes this requirement one step further, and requires that highly critical flows have parallel paths that are segmented so as to be merged and split again every few hops. The desired outcome would be that the streams can be matched at the end of each segment, and if a packet was lost on one path in one segment, it can be re-injected at the end of the segment from a copy on another path in that segment.

These current approaches, however, are limited to routes as computed by a central entity. According to the techniques herein, however, time-based paths may be allocated using a distributed routing protocol (e.g., RPL). Several routing protocol extensions are specified herein in addition to techniques for signaling such a path on a hop-by-hop basis. In particular, as described herein, the techniques define an approach that carries a requested maximum delay budget. As described herein, the techniques herein provide the capability by routers to allocate time slots dynamically (e.g., for improved scalability of applications over TSCH), and more particularly, they define the way the time slots are signaled in the distributed routing protocol with minimum impact on the protocol flows. Furthermore, the techniques herein also add the capability of using this deterministic approach (time slot and budget) to find alternate paths and to use a replication and elimination mechanism for forwarding the data packets.

Illustratively, the techniques described herein may be performed by hardware, software, and/or firmware, such as in accordance with the timeslot allocation process 248, which may contain computer executable instructions executed by the processor 220 to perform functions relating to the techniques described herein, e.g., in conjunction with routing process 244. For example, the techniques herein may be treated as extensions to conventional protocols, such as RPL or other routing protocols or protocols tasked with timeslot allocation, and as such, may be processed by similar components understood in the art that execute those protocols, accordingly.

Operationally, a first aspect of the techniques herein is to distribute timeslot allocation using a distributed routing protocol (e.g., RPL). Generally, there is the expectation—that seems relatively accepted—that with the current ranges of channels and the low density of traffic, it is acceptable for each parent to manage a pool of timeslots.

In one particular embodiment, timeslot allocation may be based on the depth, where each parent node is conscious of its depth N (distance from the root node of the routing topology) and nodes at a given depth own natively the timeslots that are multiples of the (N+2)th prime number (0, 1, 2, 3, 5, 7, 11, 13, etc.). For example, the root device (a depth N=0), would own timeslots that are multiples of 2 (the second or "0+2"th prime number). Next, nodes 11, 12, and 13 (one hop, depth N=1), would own timeslots that are multiples of the third ("1+2"th) prime number 3. Furthermore, nodes two hops away from the root (e.g., nodes 21, 22, etc.) would own timeslots that are multiples of 5 (the fourth, or "2+2"th prime number, while nodes at a depth of three (N=3) would own timeslots that are a multiple of 7 (the "3+2"th or fifth prime number), and so on.

For example, as shown in FIG. 4, assume that a superframe 400 of timeslots 420 illustrates 26 timeslots (the number of timeslots in typical protocols differs, but FIG. 4 is merely an example). In this simplified arrangement, each node depth, N=R (or zero) through N=8, is shown having at least one timeslot of its own (i.e., a prime timeslot), and then various degrees of overlap over the course of the superframe. As can be seen, nodes closer to the root (including the root itself) have more allocated timeslots, since generally they may be associated with more traffic. In the event of a network having a greater depth than would be available with prime numbers, various techniques may be used to allow for overrun or "rolling over" into the superframe, or other mitigation techniques.

Note that in one embodiment, each parent node may assign an offset for each channel that depends on the particular channel number and on a random number associated to the node. There will still be collisions between siblings, however, but in one embodiment, a parent may first listen to a timeslot and then only allocates it if it finds no activity there. In one embodiment, parent nodes may proactively compute in advance a number of timeslots that it expects to need to allocate (e.g., in the near future), and listens to those timeslots to validate that the channels stay clear. Note that collision resolution may also be managed by using a distributed algorithm based on the number of children and/or amount of traffic handled by the parents.

Notably, for maximum spatial reuse, a timeslot should be reused as soon as the emission does not interfere with an existing communication and reciprocally. In one embodiment, a distribution algorithm (e.g., "trickle", as will be understood in the art) may be used to inform nodes within the network about used slots two hops away. According to a more advanced technique as defined herein, nodes may be configured to compute the size of a sphere of influence in such a fashion that, for example, if node A talks to B and C talks to D, then C's signal is sufficiently attenuated when it reaches B that it cannot interfere with A's signal in a fashion to corrupt A's signal. So the techniques herein ensure that the distance from node A to D and from B to C is sufficient in terms of signal loss. Note that nodes A and C could be relatively close if they talk in opposite directions, and this technique may still adequately it might still work. Note also that for D, it may be hard to realize whether it is far enough from A because the domain of interference may be larger than the domain of communication. The techniques herein thus suggest that a trickle multicast propagation of link slot information could include metrics about reception from A, so that with some triangulation from neighbor information, D may determine that it is far from A so it can use that same slot with low risk of interference. D may thus stop propagating the information for the far away A and could decide to reuse that slot.

Also, in one embodiment, a parent may prefer to reuse timeslots that it has previously allocated and then deallocated rather than carving new timeslots. Moreover, in another embodiment, the parent may blacklist timeslots that proved to be error prone, meaning that probably there is an interferer such as a hidden station.

A second aspect of the techniques herein distributes timeslots within a distributed routing protocol (e.g., RPL) for a certain flow. In particular, the techniques herein may newly define an option (e.g., sub-options 328) in the DAO and DAO ACK messages to transport information about schedules and reservation. For instance, in one particular embodiment, the techniques herein add an option to the DAO that is attached to the target option (e.g., in a fashion similar to the transit option, with the same factorization rules, as will be appreciated by those skilled in the art). This option illustratively contains:

an absolute time of cycle that is the time by which a message must have arrived to the target for a cycle, and the cycle period. (The absolute time may be in the past or the future.)

a relative time TC that is initialized by the target at the maximum acceptable latency. TC will be decremented as the reservation progresses back to the source of the flow, and the goal is to keep it positive.

a requested amount of bandwidth expressed in burst size, and excess burst, by period. The period is expected to be adapted based on knowledge of superframes employed in the network, so a request may be expressed as N slots per P superframes with typically N or P set to 1.

In the DAO ACK, the techniques herein may also illustratively place the target option associated with a new option to inform the child of which timeslots the parent has allocated in the parent's range of timeslots. Also in the DAO ACK, the parent node returns the timeslot information for the one (or more) timeslots that are allocated for the ways up and down. Note there may be zero or more of each. For example, if the child node requested for excess burst only, there may be no allocated slots either direction, and the traffic will use best effort timeslots, also owned by the parent. Note that the best effort timeslots are shared between children and allocated more or less reactively to traffic. Note that this may utilize a newly defined extension to the RPL protocol for hop-by-hop processing of such DAO messages.

A newly defined message may also be used to return negative replies, that is forwarded by the parent node to the requester, should the request no be satisfied (e.g., the required delay cannot be satisfied). Conversely, in another embodiment, the total expected delay may be carried within the DAO ACK message and provided back to the requester in case of success to allocate a series of timeslots along the path (i.e., a resultant time-synchronized path).

In yet another embodiment, upon reception of the confirmation that a time synchronized path meeting the requirement has been allocated, the requester may issue a second request towards a different parent to evaluate whether a "better" path can be found. Indeed, although the second parent may report a less qualitative path with regards to certain routing metrics (e.g., the ETX), in deterministic wireless, it may happen that the overall delay along the time synchronized path is indeed shorter towards a parent reporting a larger path cost.

A third aspect of the techniques herein relates to finding alternate parents and building an alternate path, while still maintaining the overall time budget. In particular, the techniques here may be used to compute an alternate down path and keep them tied so as to form a ladder in a distributed way, and particularly to enable replication and elimination at each node.

Illustratively, according to one or more embodiments of the disclosure regarding this third aspect, a node within a DAG may select a parent node, and based on the corresponding grandparent (the parent's parent), may also select an alternate parent node that has connectivity to the grandparent and the node itself. The node may then inform its parent and alternate parent about the prefixes that can be reached via the node in the downward direction, such that the parent continues to forward that information to the grandparent, along with the indication to use the alternate parent in the event the parent becomes unreachable. To prevent fan-out of this information, the alternate parent may simply store the reachability information for use when the node's grandparent forwards traffic on the established alternate down path.

Figure 5:
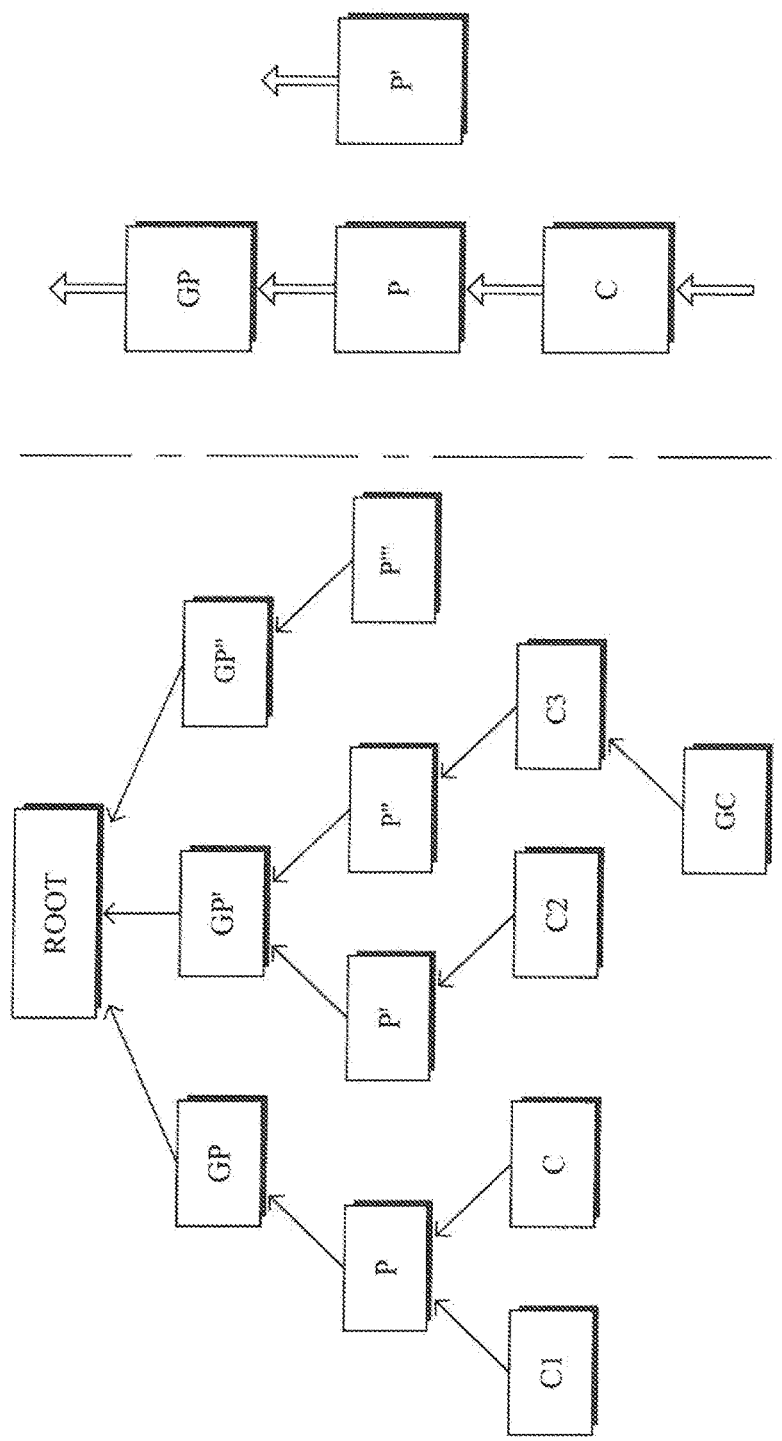
FIG. 5 illustrates an example DAG/tree.

Note that a tree or DAG may be represented as a collection of paths consisting of a list of links and next-hops. As noted above, the downward path from the root of a DAG to a destination in the DAG is basically the reverse of the upward path established from the destination to the root node. According to the techniques herein, an alternate or bypass is established for each hop on the downward path to protect against poisoned links or broken next-hops. Recursively, the path can be seen as a chain of attached child nodes ("C") and parent nodes ("P"), and as used herein, a parent of a parent is referred to as a is grandparent ("GP"), as depicted in FIG. 5. Note that as used herein, C, P, and GP are used to described certain roles with respect to the techniques herein as a matter of perspective between nodes, and a particular node "N" represents a node from its own perspective, thus a node N may act as a C, P, GP, etc., depending upon its current role in the techniques described herein.

Operationally, according to this third aspect, any node N may advertise (e.g., broadcasts) its list of neighbors into the DAG, namely those neighbors that are visible/reachable to N. This advertisement may be a simple Hello message or other known distribution protocol, and may be transmitted periodically or in response to creation of a DAG or other trigger. For instance, as shown in FIG. 5, a node P may announce its neighbors as GP, P', C, C1, etc. This announcement may also include one or more metrics indicating, e.g., the quality of transmission in one or both directions, for use in selected preferred paths for the DAG as described above.

Figure 6:
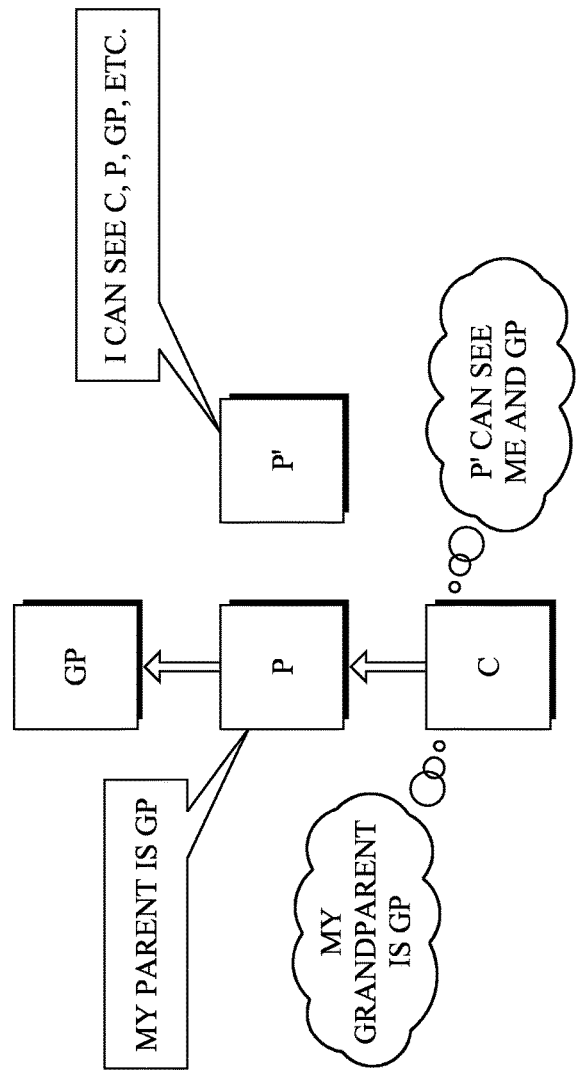
FIG. 6 illustrates an example message exchange and determinations.

Additionally, a tree or DAG may be built in the upward direction, where each child node C selects a preferred parent P within the DAG, illustratively that optimizes metrics (based on the objective function) in the parent-to-child direction. According to the techniques herein, and as shown in FIG. 6, parent nodes announce their own parents into the DAG (e.g., within a DIO message while building the DAG), such that each child may determine its grandparent node GP. Based on the resultant grandparent GP, a child node C of a parent P may select an alternate parent P' that has connectivity to both GP and C. Note that P' may be selected based on good metrics (e.g., a good signal) from GP to P' and from P' to C. Note that as an alternative to Hello messages carrying neighbor lists, this information may be requested on demand, such that a child device C may multicast a message into the DAG that it needs to reach GP, requesting a set of candidates to respond from which C can select GP, P, and P'.

Figure 7A:
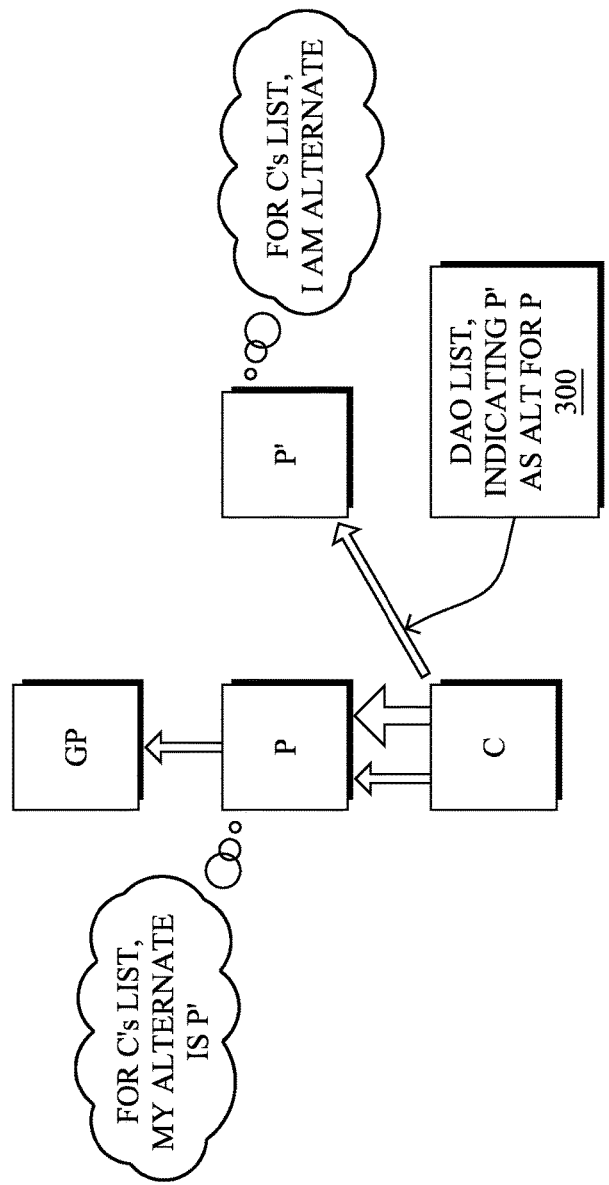
FIGS. 7A-7N illustrate an example message exchange and determinations.

As shown in FIG. 7A, C may then send routing advertisements, such as RPL DAOs 300, to P indicating that P' is the alternate for P for the list of prefixes within the routing advertisement. That is, C informs P about prefixes (routes) reachable via C and also about P' as an alternate parent node to P to reach the prefixes reachable via N in the event P becomes unavailable. C also sends the same advertisement to P', indicating still that P' is the alternate parent for the prefixes contained in the message. Notably, the message sent to P and P' may comprise a single, e.g., wireless/radio, transmission, that is received by both P and P' separately on respective network interfaces.

Figure 7B:
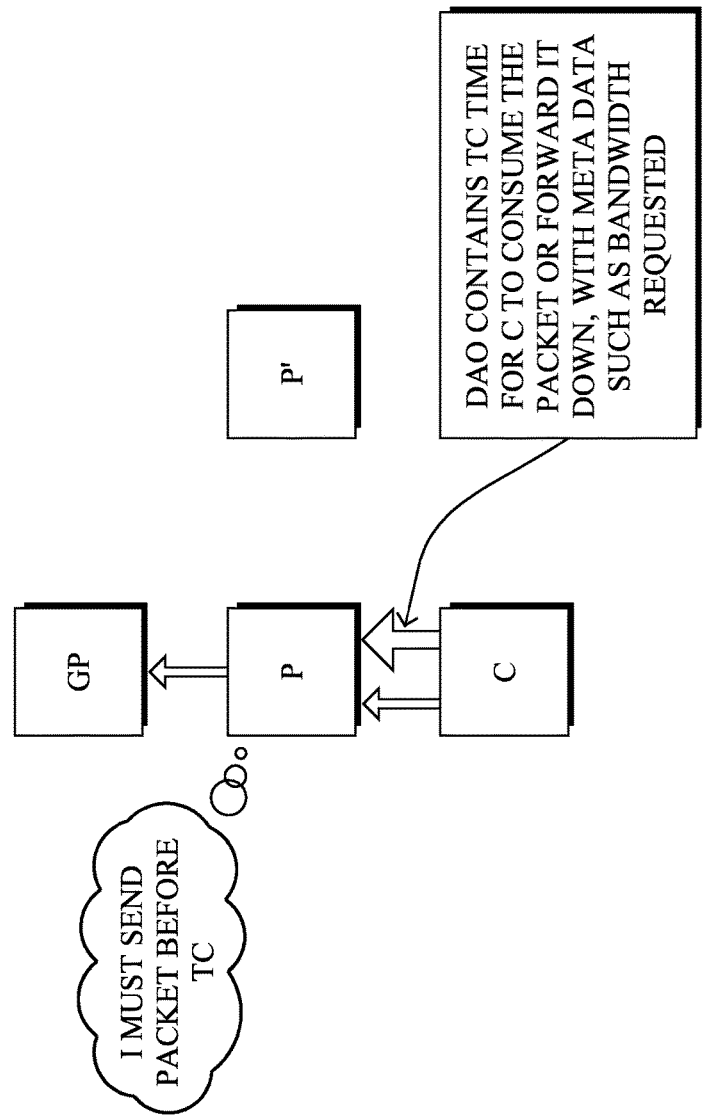
Figure 7C:
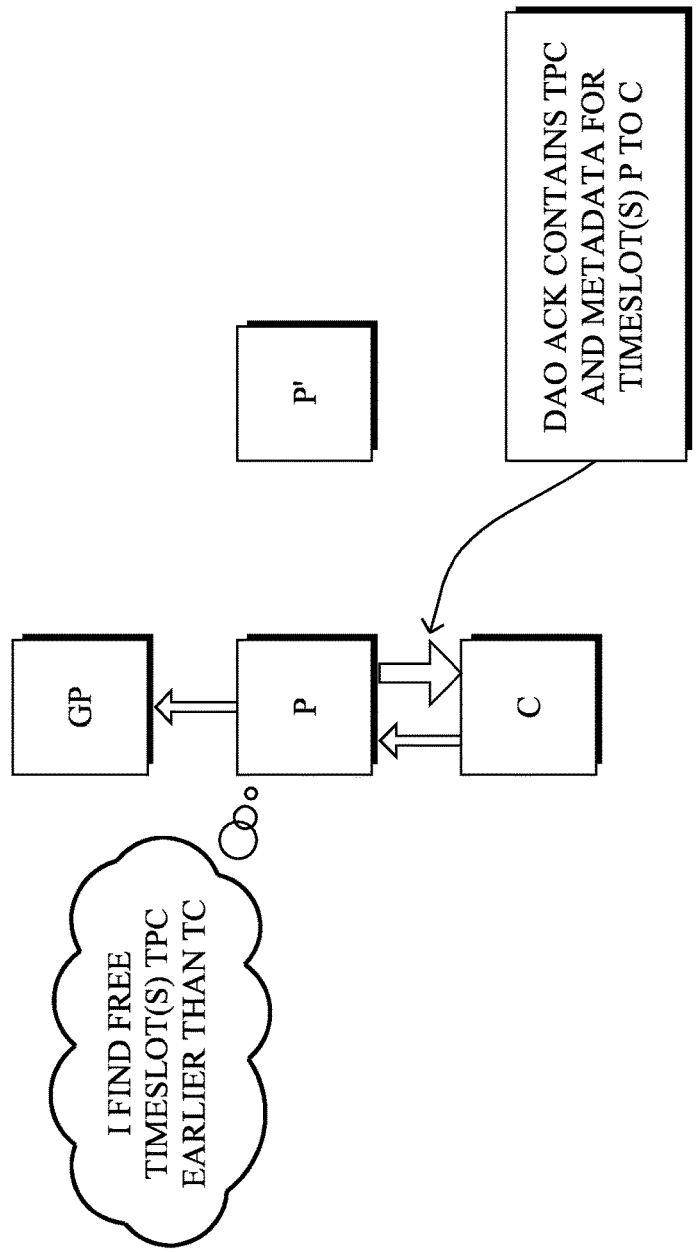

According to the techniques herein, in FIG. 7B C sends DAOs to P indicating that P' is the alternate for P, where the DAO carries a relative time TC at which the final destination C will consume the packet of forward it downward, with metadata such as bandwidth requested. Note that TC can be set to maximum latency. Also, as shown in FIG. 7C, C and P negotiate a timeslot for P to C at TPC, TPC being earlier than TC. In one embodiment, this is a decision of P, and that the resulting timeslot information may be simply returned in a DAO ACK.

Figure 7D:
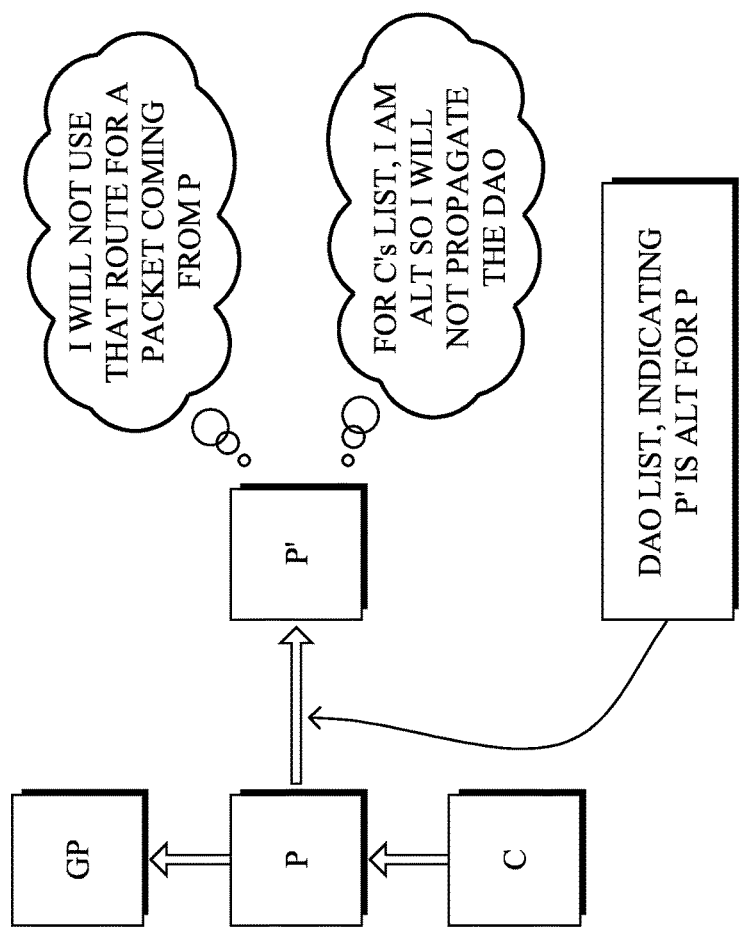
Figure 7E:
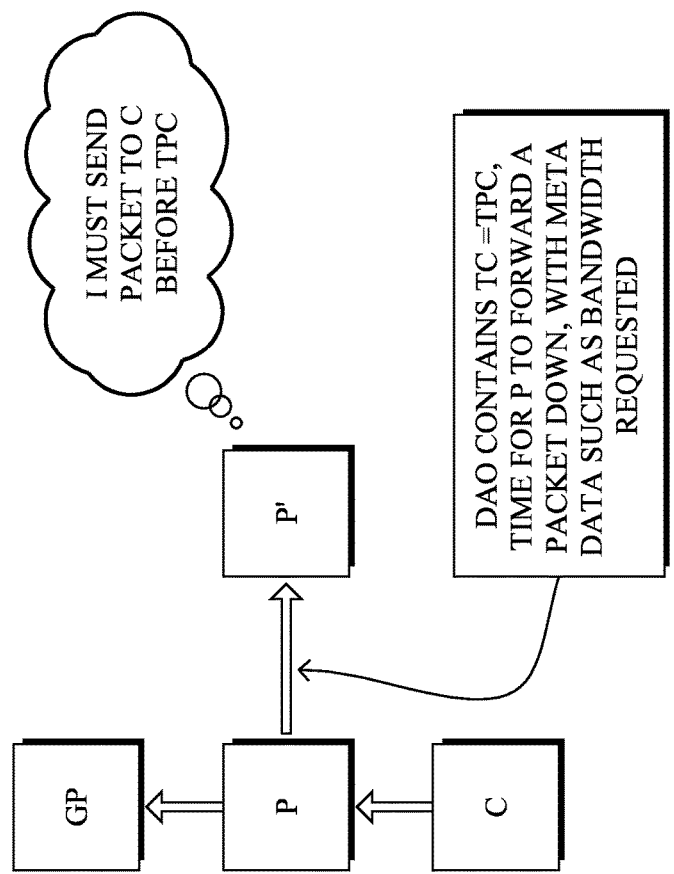
Figure 7F:
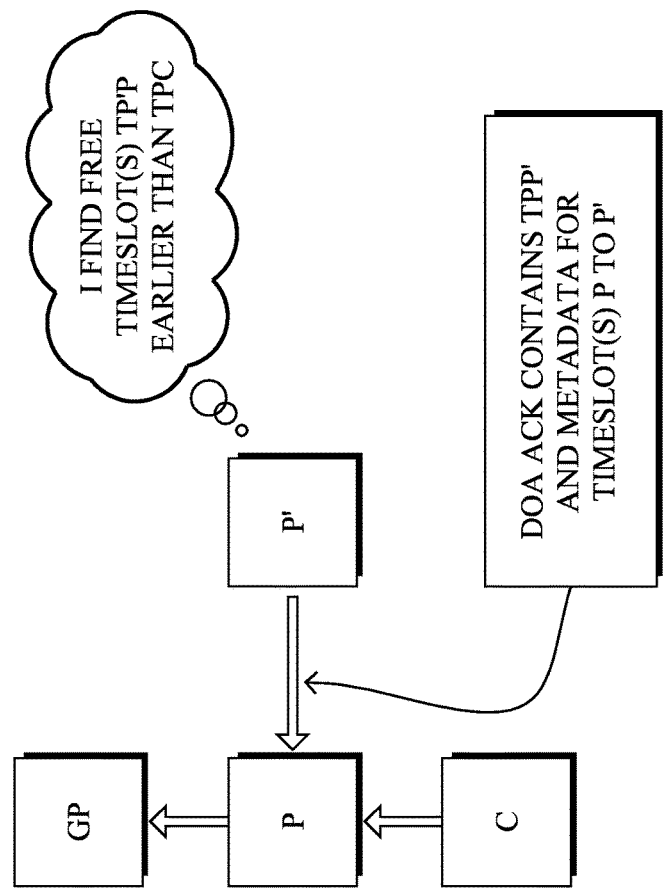

If P and P' see one another, then they can route as siblings. As such, as shown in FIG. 7D, P sends the DAO list to P', indicating that P' is the alternate for P. Since P' is the alternate parent for C's list, it will not propagate the DAO (to avoid fan-out), and configures itself to not use those routes for packets coming from P. Also, as shown in FIG. 7E, the DAO contains TC=TPC, the time for P to forward a packet down to C (e.g., with metadata such as bandwidth requested), and P' is thus aware that it must send a packet to C before TPC. Also, as shown in FIG. 7F, P' attempts to find at least one free timeslot TP'P (from P' to P) that is earlier than TPC. P' may then send a DAO ACK to P that contains TPP' and optionally metadata for timeslot(s) P to P'.

Figure 7G:
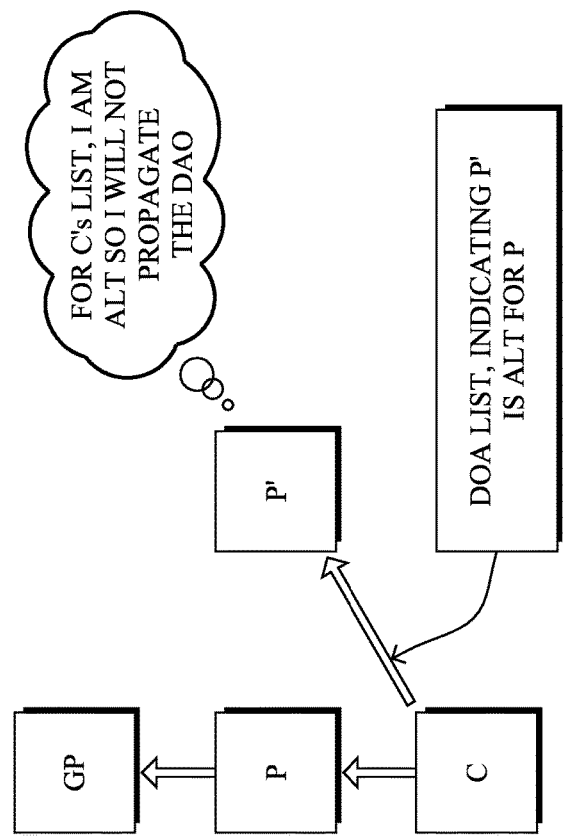
Figure 7H:
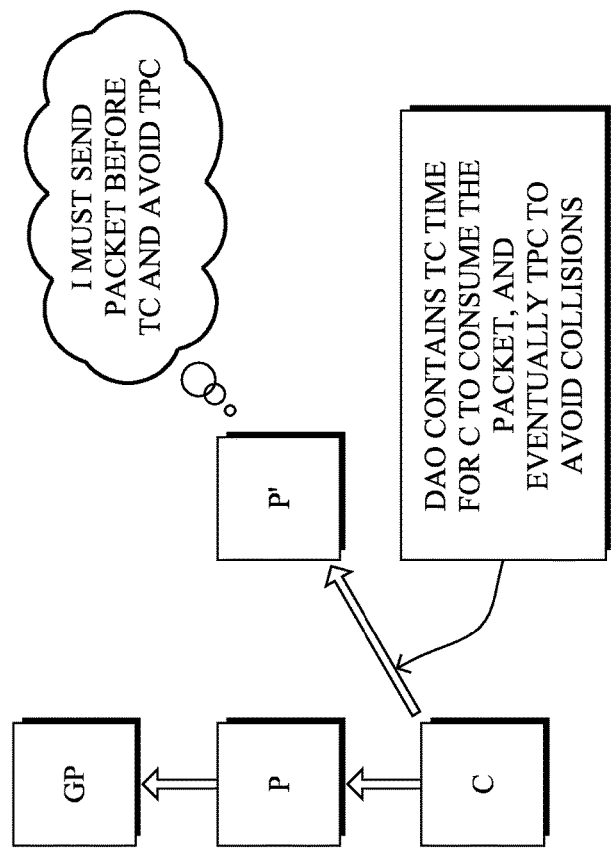

As shown in FIG. 7G, C sends alternate DAOs to P' (that are not forwarded), where the included DAO list indicates that P' is the alternate for P. As such, P' prevents the forwarding of the DAO for C's list. In addition, as shown in FIG. 7H, the DAO also carries the time basis TC for C to consume the packet, and eventually TPC to avoid collisions, and as such, P' is aware that is must send the packet before TC and avoid TPC.

Figure 7I:
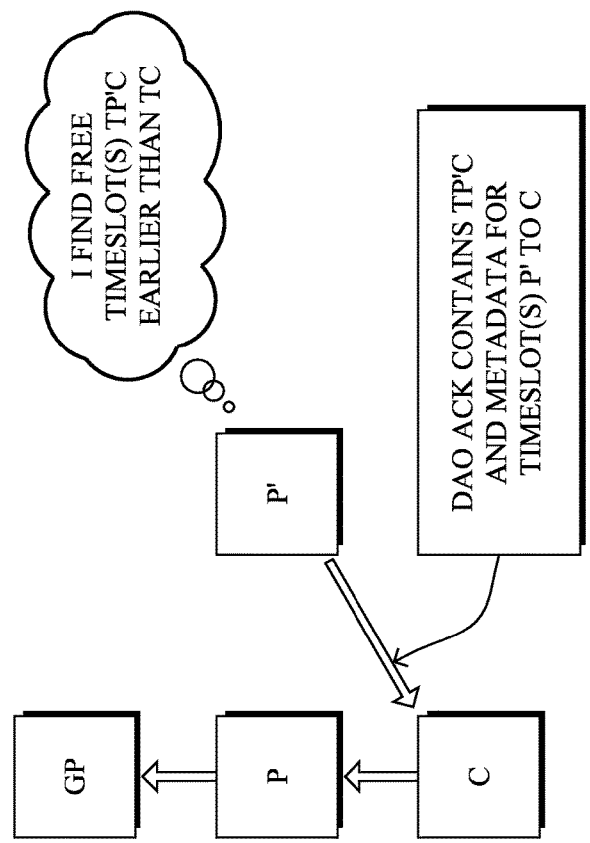
Figure 7J:
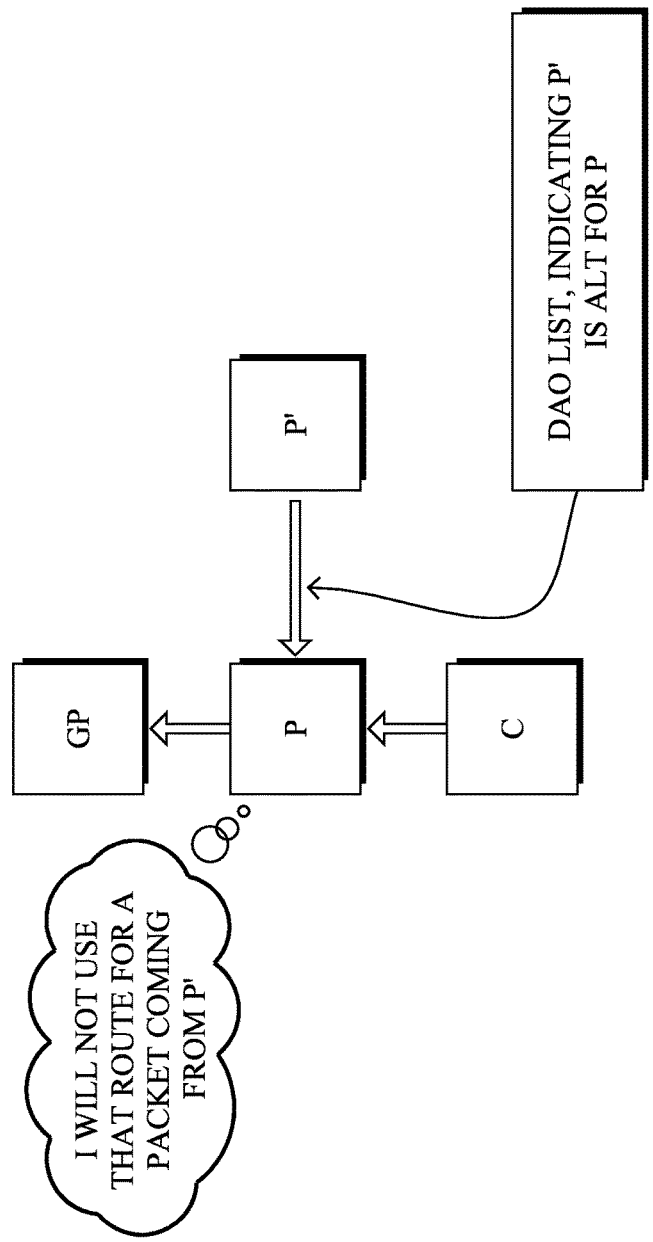
Figure 7K:
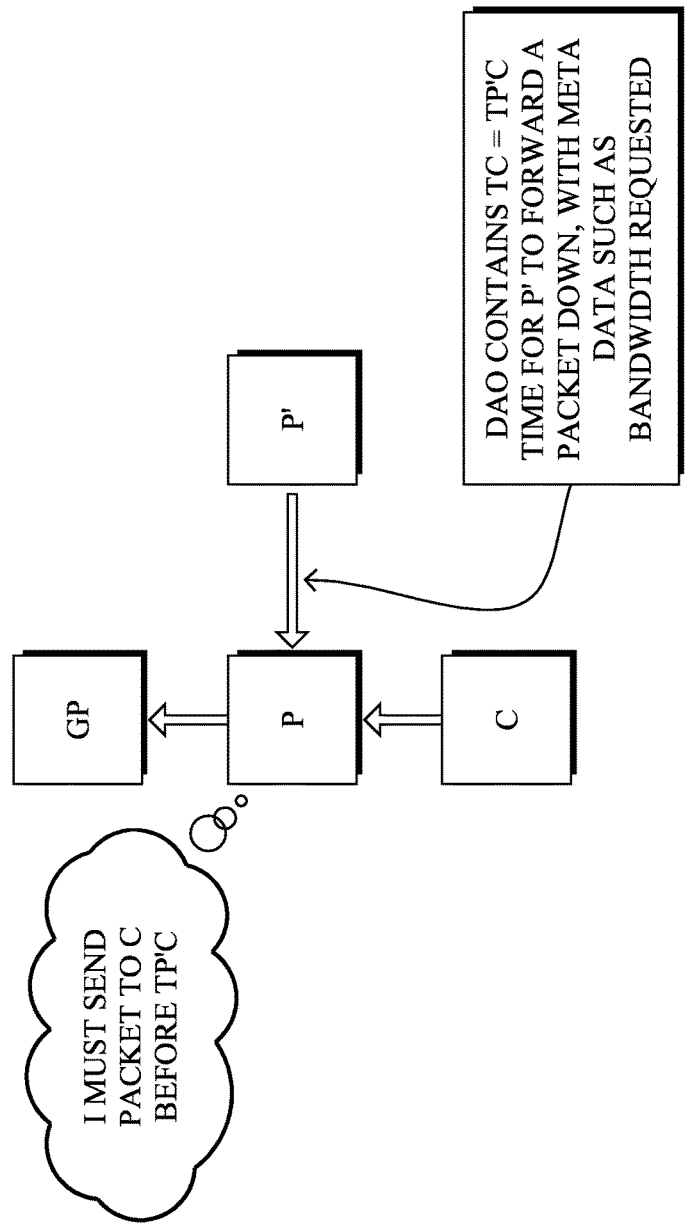
Figure 7L:
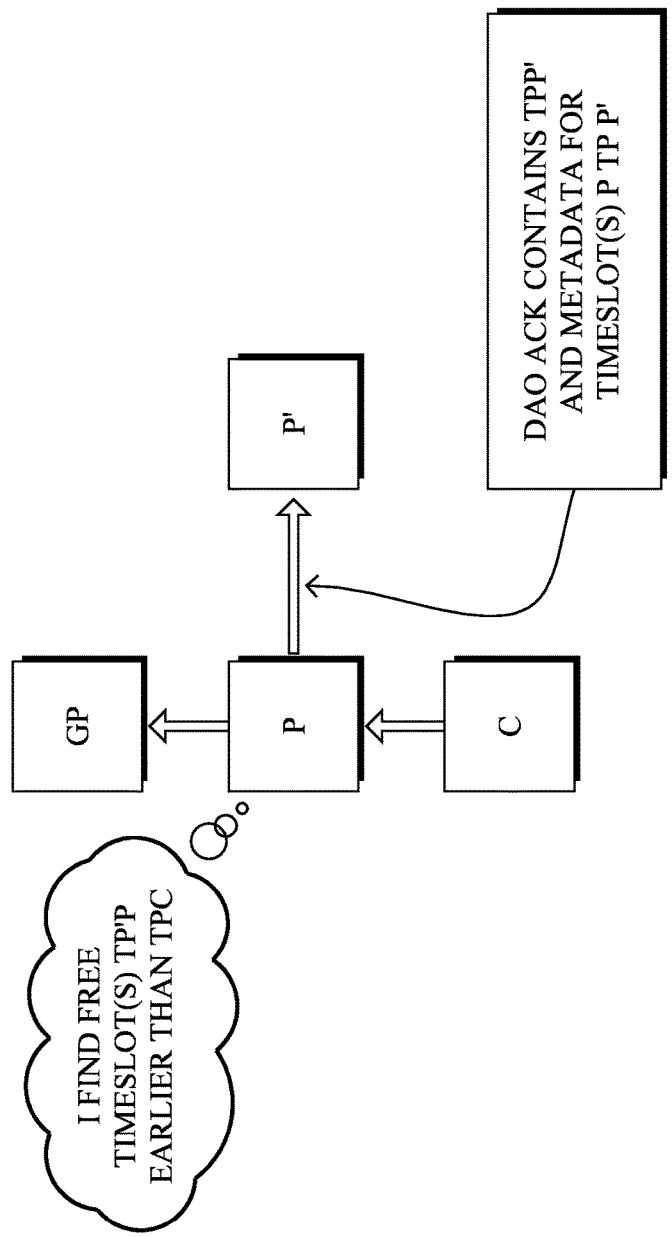

As shown in FIG. 7I, C and P' negotiate a timeslot for P' to C at TP'C that is earlier than TC, and returns a DAO ACK containing the TP'C and associated metadata for timeslot(s) P' to C. As mentioned above, and now as shown in FIG. 7J, P' may also see P as a sibling, and as such, sends C's DAO indicating that P' is alternate parent, so P knows not to use that route for a packet coming from P'. As shown in FIG. 7K, the DAO may also carry the time constraints to P, that is, TC=TP'C time for P' to forward a packet down to C. Now P knows that is must send the packet to C before TP'C. In FIG. 7L, P attempts to find one or more free timeslots TP'P that are earlier than TPC, and returns a DAO ACK containing TPP' and metadata for timeslot(s) P to P'. P and P' now have a time reference by which they must have received the packet to finally meet TC.

Figure 7M:
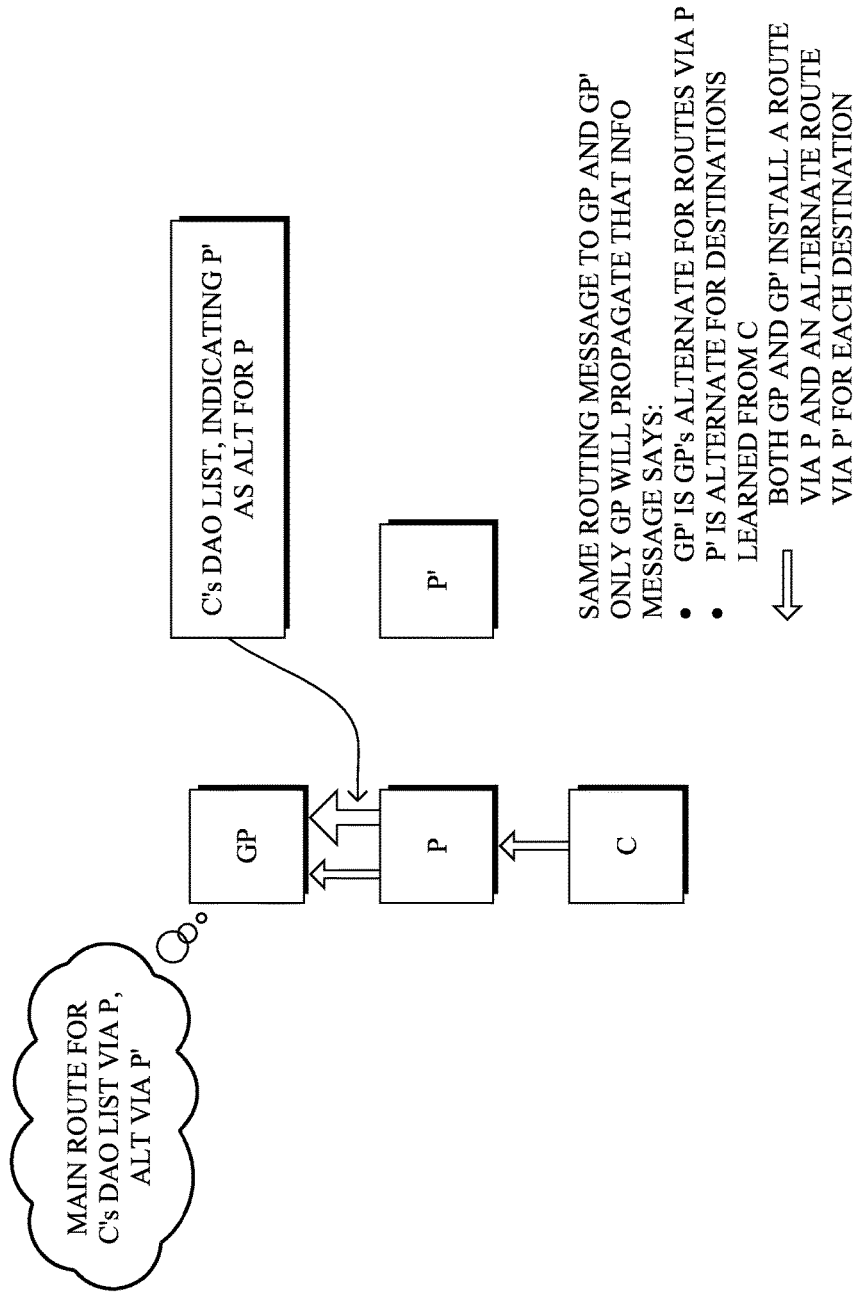

As shown in FIG. 7M, P propagates C's DAO (indicating that P' is the alternate) to its parent GP (C's grandparent), which is then aware of the main route for C's DAO list via P (and alternate P'). The DAO is also sent by P to any alternate GP', similar to C sending its DAO to P' above (i.e., indicating GP' as the alternate for GP, and now indicating that P' is the alternate for destinations learned from C). Both GP and GP' install a route via P and an alternate route via P' for each destination. Additionally, in FIG. 7N, the DAO also includes TC set to the earliest of TPC and TPP' associated to the target C. As such, GP knows that it must send a packet to target C via P before TC. Also, if P' sees GP', they will coordinate as well with TC set to the earliest of TP'C and TPP. GP will at most send data via GP', P, and P'. In the general case, the TC passed to its parent is the earlier time at which a node will need to forward to C via any of its three potential next hops, its sibling, and the two children, and TC is passed to the sibling as the earlier time at which a node will need to forward to C via any of the two children.

Figure 8:
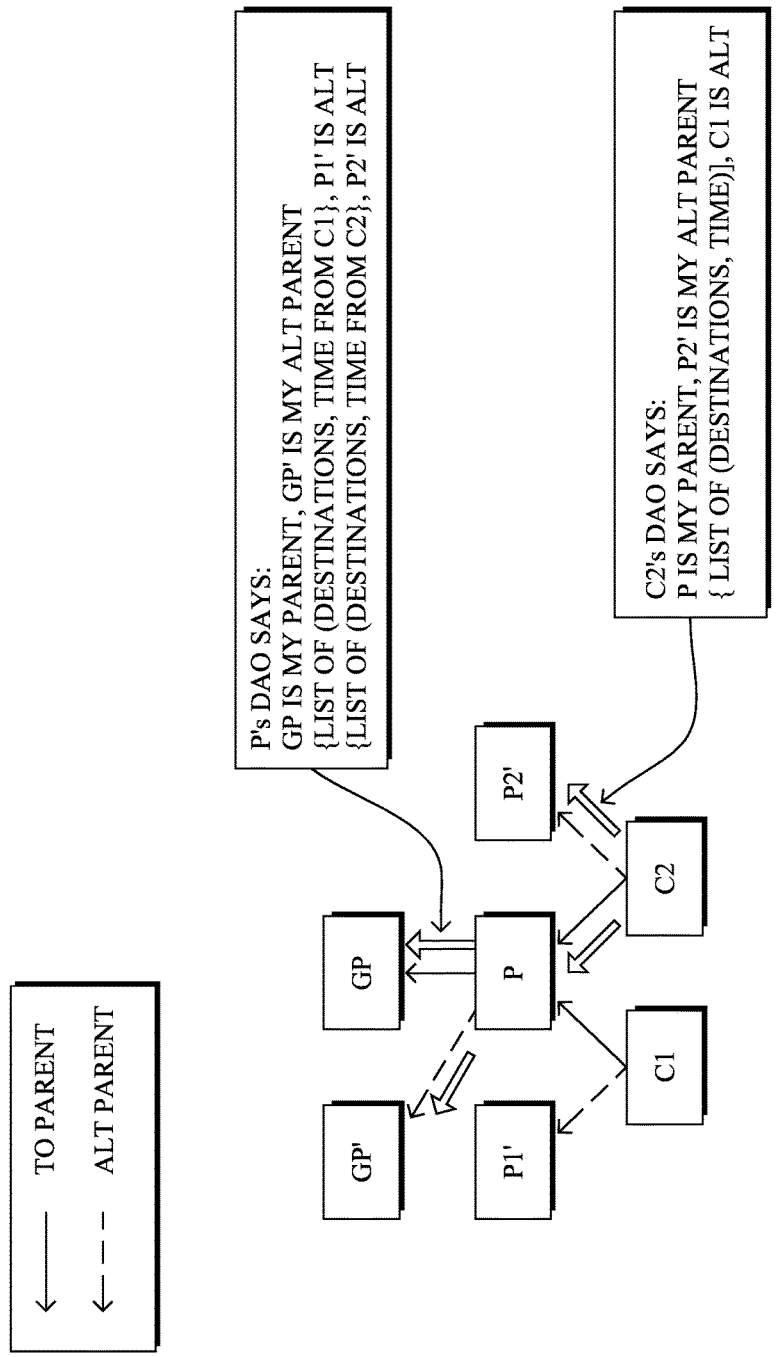
FIG. 8 illustrates an example message exchange and determinations.

Notably, the example above is somewhat simplified, in that child device C was the only child to parent device P. As shown in FIG. 8, however, it is often the case that a parent device has multiple children. Assuming there is only one alternate parent P' for all of the children, then the parent P could send GP (and GP') a compiled list of destination prefixes reachable by all of the children (and associated time), and that P' is the alternate for all children should P become unavailable. As shown in FIG. 8, though, more complex situations may arise, where two or more children to P, C1 and C2, may each select their own corresponding alternate parent, P1' and P2', respectively. When receiving information about prefixes from a plurality of child nodes in this manner, the parent P may inform GP (and GP') about each of the sets of prefixes (and times) as well as a separate corresponding alternate parent for each (e.g., P1' and P2').

Figure 9:
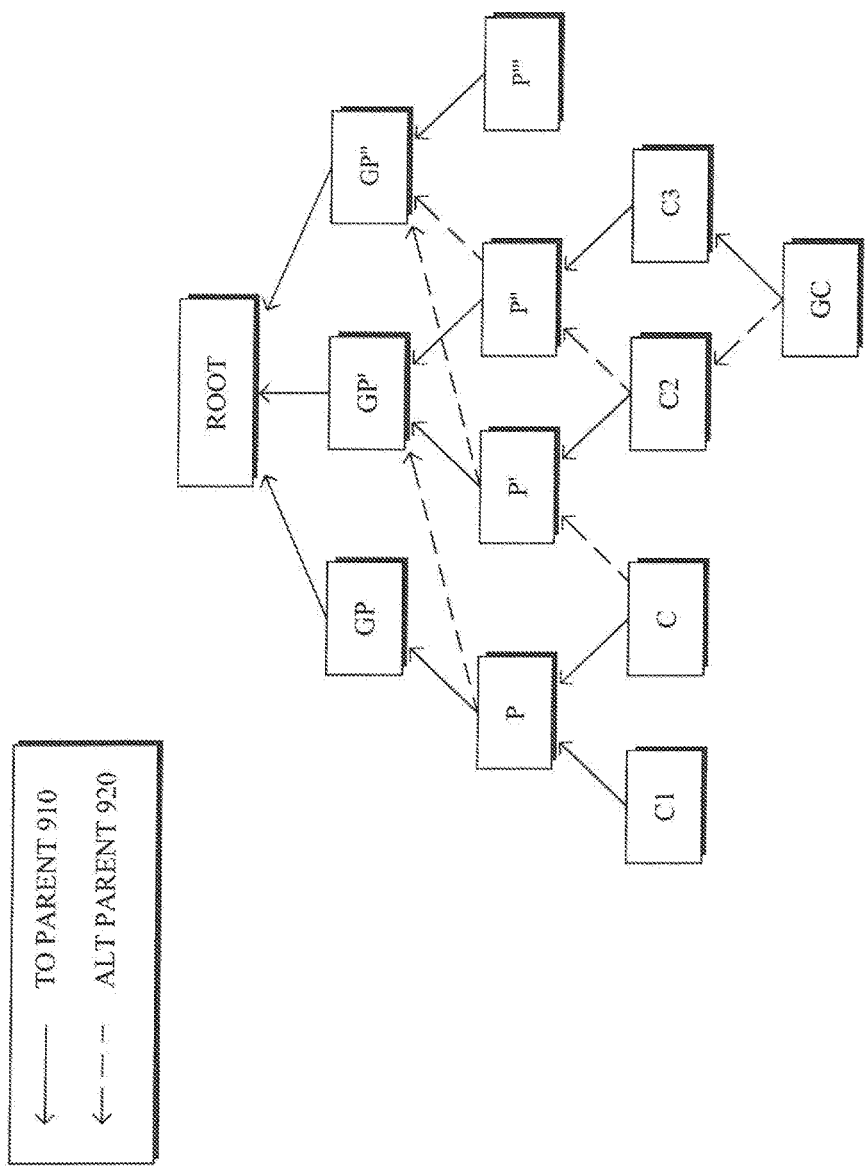
FIG. 9 illustrates an example message exchange.

This logic starts from the destinations, acting as C, and continues toward the root device until the root device is a parent (i.e., until determining that there is no grandparent). FIG. 9 illustrates an example reply message (e.g., DAO) propagation from destinations toward the root device and resultant parent/alternate selections, showing messages 910 sent to the parents, and messages 920 sent to alternate parents. Note that not all hops may have an alternate parent P' or alternate grandparent GP', but those that have the option are configured with the alternates accordingly. Note also that while a succession of devices from child C to grandparent GP to root is shown, the length of the DAG is substantially limitless, where the children can act as parents to other devices (e.g., a "grandchild, GC"). That is, all devices other than the root are children, those with children are also parents, and those with grandchildren are grandparents, etc. Thus, any node "N" can be a child, a parent to receive information from a child, an alternate parent to a child, a grandparent or alternate grandparent to a grandchild, etc.

Figure 10:
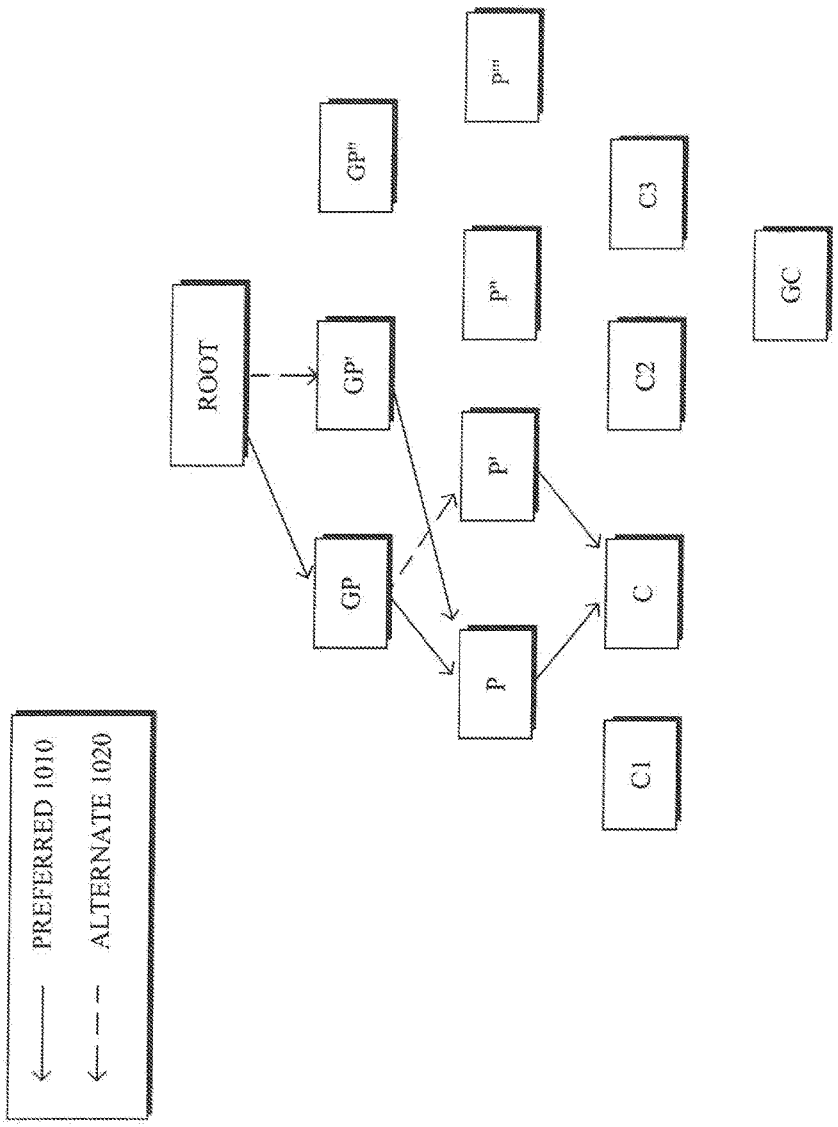
FIG. 10 illustrates an example down data path.

FIG. 10 illustrates an example downward data path from the root device to the destination child node C built as described above. For instance, the preferred path 1010 may be used when there are no problems reaching the preferred devices along the path. However, at various points of the DAG, an alternate path 1020 may be used to traverse the problem area, accordingly.

Figure 11:
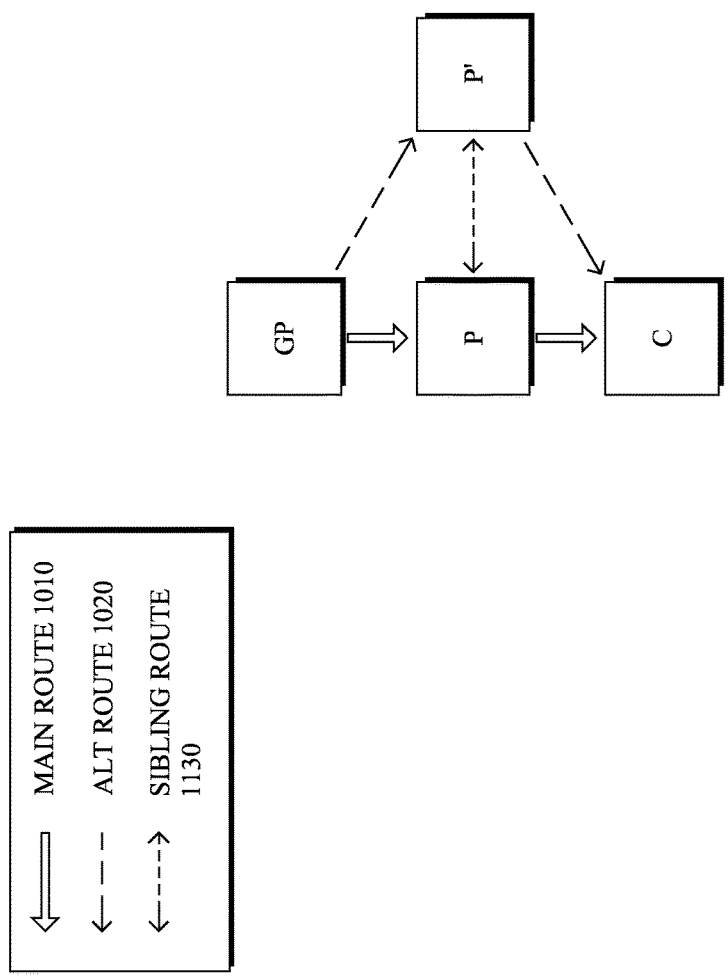
FIG. 11 illustrates an example interconnection between devices.
Figure 12:
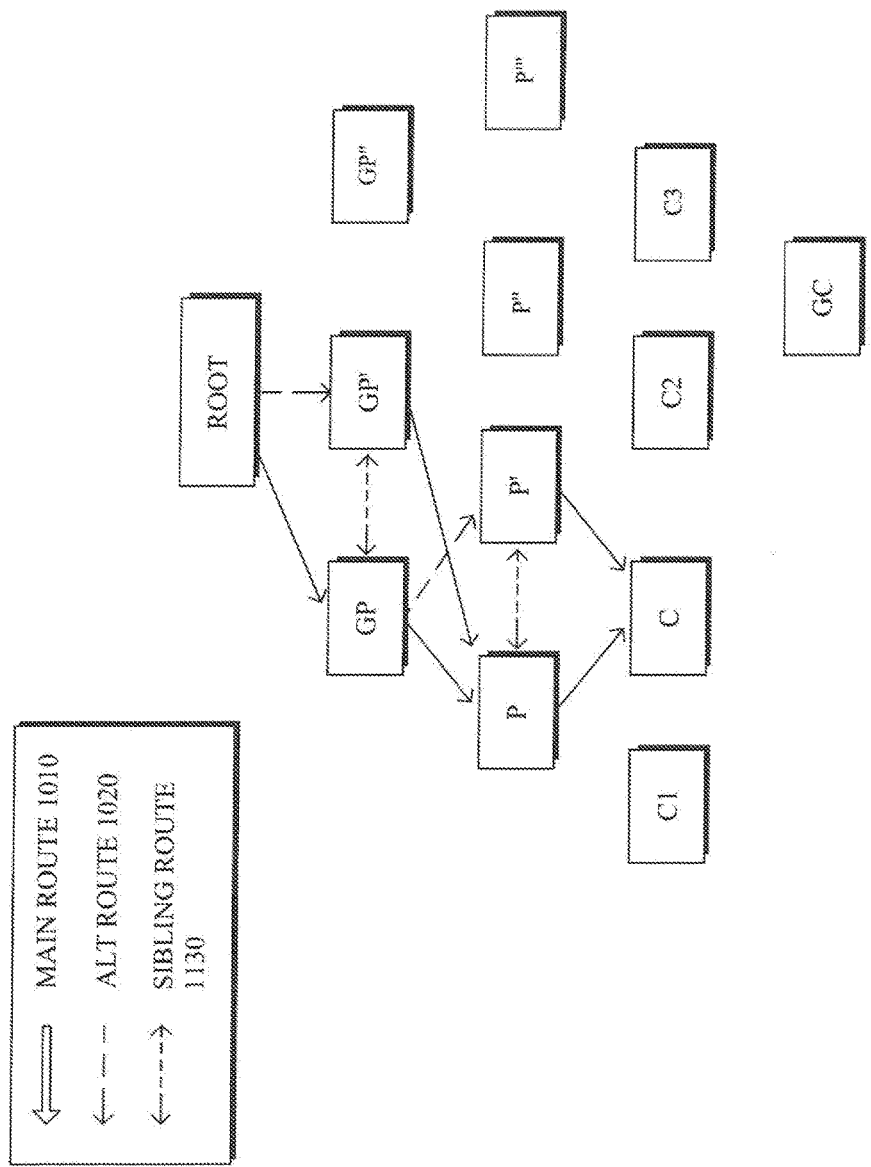
FIG. 12 illustrates an example down data path.

According to one or more embodiments herein, P and P' devices may also establish a sibling route via each other, as shown in FIG. 11. For instance, to encourage the sibling connection between P and P', child node C may initially select P' based on its connectivity to P as an added bonus. Sibling routes 1130 are generally formed in both directions between the devices (assuming acceptable metrics), such that it can be used both ways to send traffic toward the destination, without looping back onto the sibling link. Each device of the sibling connection may be configured to prefer the alternate path, unless that link fails at which time a sibling route may be used to return to the preferred parent (e.g., where the initial reroute was based on a failed GP to P link, and not a failure of P). The data path to C showing sibling routes between devices (parents and grandparents) is shown in FIG. 12.

Figure 13:
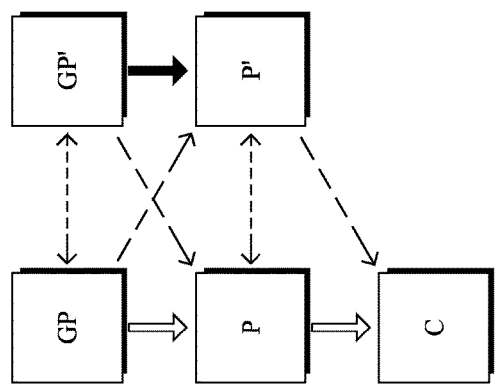
FIG. 13 illustrates an example interconnection between devices.

Note that parent node P may also instruct GP' (an alternate parent to GP for P) that P' is an alternate for P for the prefixes reachable via C. If GP' can reach P', e.g., with appropriate metrics, then GP' may also set alternate routes via P' for all prefixes reachable via C, referred to as an established secondary route 1340 as shown in FIG. 13.

Figure 14:
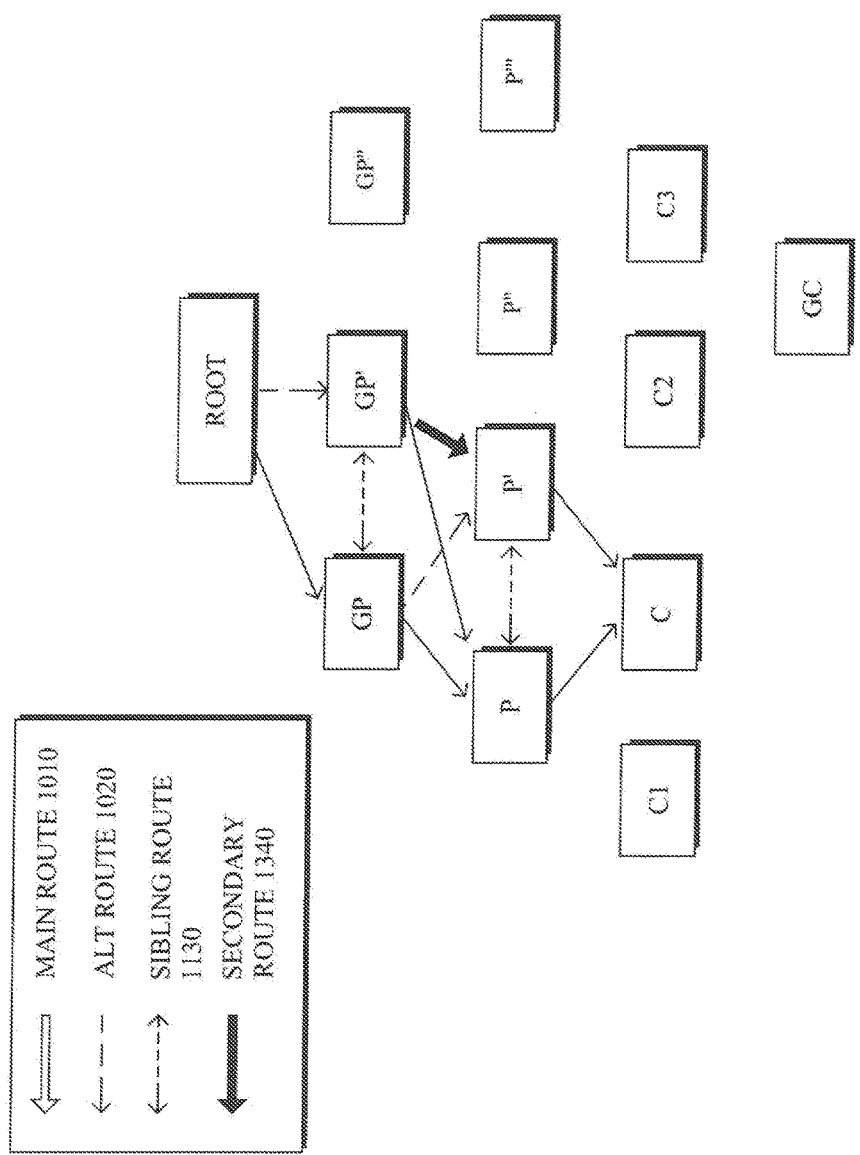
FIG. 14 illustrates an example down data path.
Figure 15:
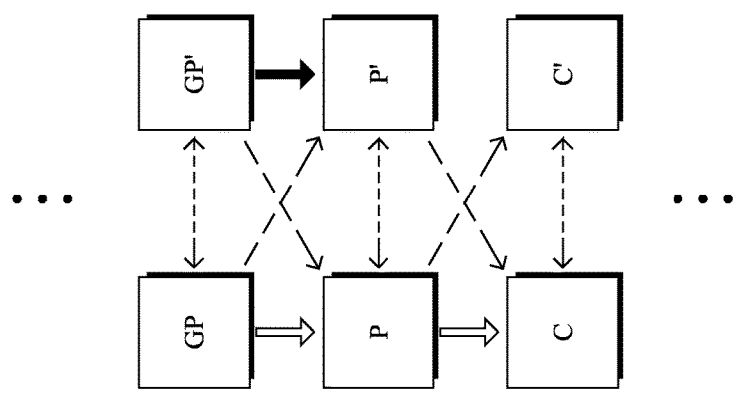
FIG. 15 illustrates an example interconnection between devices.
Figure 15:
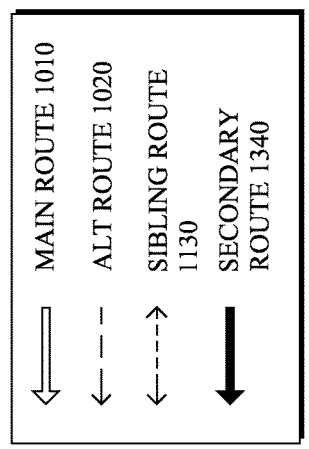

The data path to C from the root including preferred paths 1010, alternate paths 1020, sibling paths 1130, and secondary paths 1340 is shown in FIG. 14. Accordingly, the recursive result of these different paths may continue along the length of the DAG as two "threads" close to one another as shown in FIG. 15, with the possibility of jumping between the threads (though favoring the preferred thread where possible) whenever a problem is encountered. Note that by limiting the distribution of the information from alternate parents and grandparents, the fan-out of this information, generally overkill beyond a first layer of protection, is avoided.

Figure 16:
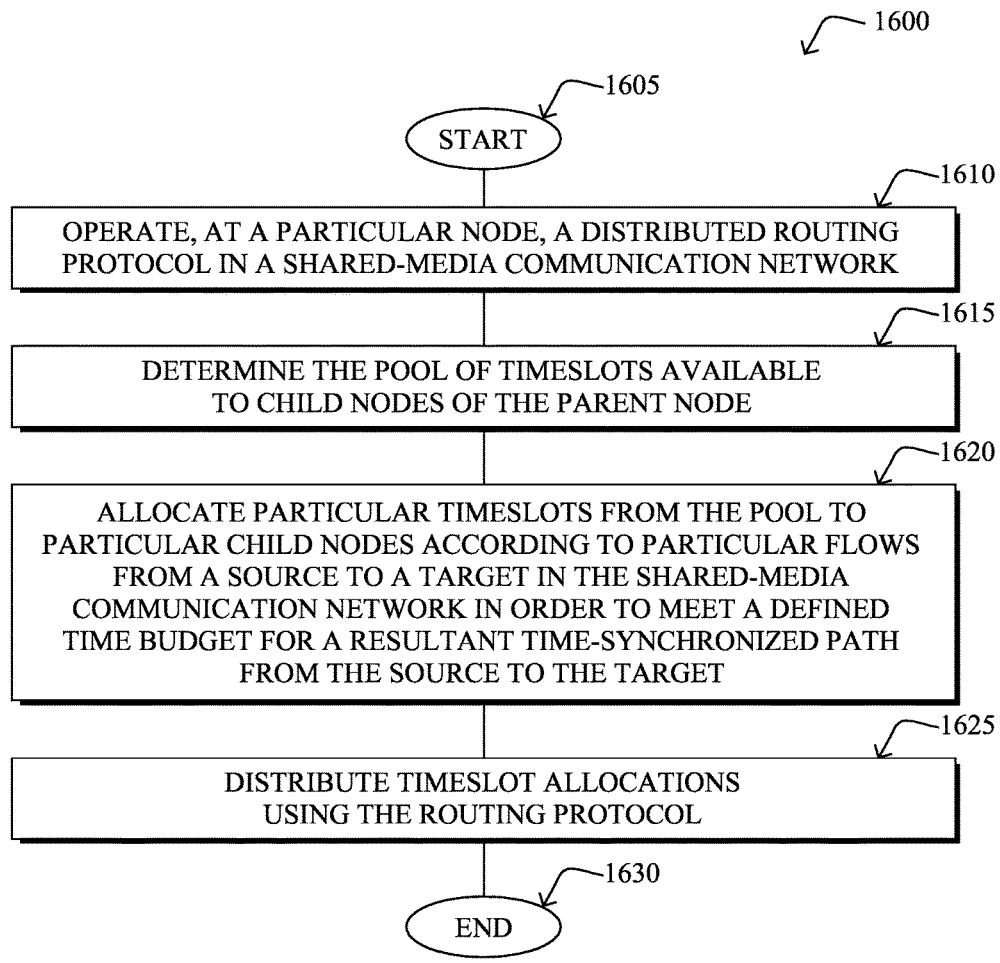
FIG. 16 illustrates an example simplified procedure for timeslot distribution in a distributed routing protocol in a shared-media communication network.

FIG. 16 illustrates an example simplified procedure for timeslot distribution in a distributed routing protocol in a shared-media communication network in accordance with one or more embodiments described herein. The procedure 1600 may start at step 1605, and continues to step 1610, where, as described in greater detail above, a particular node operates a distributed routing protocol (e.g., RPL) in a shared-media communication network. In step 1615, the node, as a parent node, determines a pool of timeslots available to child nodes of the parent node. For example, as described above, the parent may determine a hop-distance (N) of the parent node from a root node of the shared-media communication network, and determines the pool of timeslots available to child nodes of the parent node as timeslots that are multiples of an (N+2)th prime number. Also, as mentioned above, the parent may apply an offset to each channel for the pool of timeslots that is based on a respective channel and on a random number associated with the parent node. In certain embodiments, as noted, the parent may receive a propagated link slot information with reception metrics, and determines that a particular remote node is outside an interference range, thus allowing use of timeslots associated with the particular remote node within the pool of available timeslots (and removing the particular remote node from propagated information from the parent node).

Furthermore, the parent may perform other optimizations, such as reserving as many timeslots as are expected to be used prior to actual allocation of the particular timeslots, preferring reuse of previously allocated timeslots within the pool of available timeslots, preventing use of problematic timeslots within the pool of available timeslots, determining whether a particular timeslot is clear prior to allocating that particular timeslot, resolving timeslot collisions with another node based on an amount of traffic at the parent node and the other node (e.g., where the amount of traffic is based on a number of child nodes of the parent node and the other node, respectively), and so on.

In step 1620, the parent node may then allocate particular timeslots from the pool to particular child nodes according to particular flows from a source to a target in the shared-media communication network in order to meet a defined time budget for a resultant time-synchronized path from the source to the target. In step 1625, the parent node distributes timeslot allocations using the routing protocol, and the simplified procedure ends in step 1630.

Figure 17:
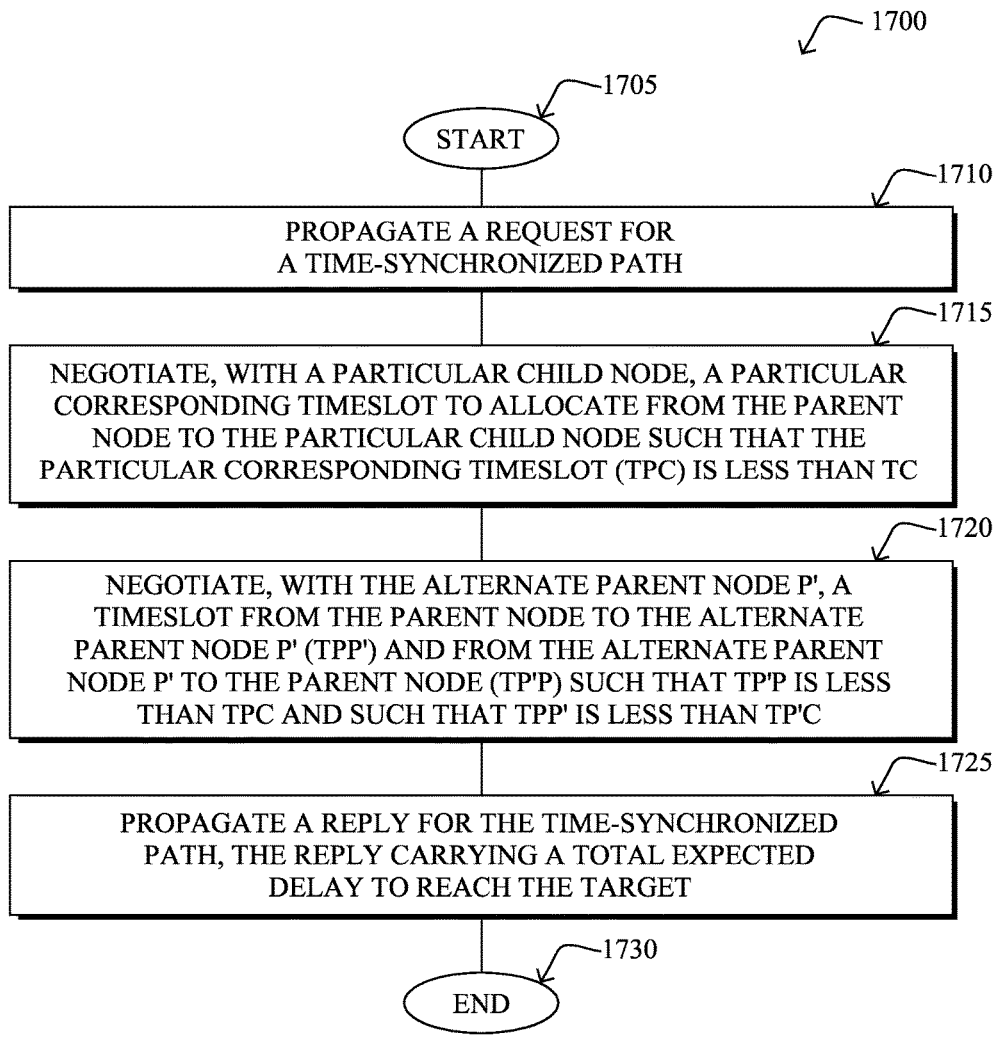
FIG. 17 illustrates another example simplified procedure for timeslot distribution in a distributed routing protocol in a shared-media communication network.

In addition, FIG. 17 illustrates another example simplified procedure for timeslot distribution in a distributed routing protocol in a shared-media communication network in accordance with one or more embodiments described herein, particularly mentioning the time-synchronized path as described herein. The procedure 1700 may start at step 1705, and continues to step 1710, where, as described in greater detail above, a parent node propagates a request for a time-synchronized path, where the request carries an absolute time of cycle for a message from the source to reach the target, and a relative time (TC) initialized to the absolute time and decremented at each hop toward the source (e.g., and optionally further carrying a requested bandwidth). In step 1715, the parent node may negotiate, with a particular child node, a particular corresponding timeslot to allocate from the parent node to the particular child node such that the particular corresponding timeslot (TPC) is less than TC.

When the particular child node selects an alternate parent node P' and negotiates with P' a second particular corresponding timeslot TP'C from P' to the particular child node such that the second particular corresponding timeslot (TP'C) is less than TC, then in step 1720 the parent node also negotiates, with the alternate parent node P', a timeslot from the parent node to the alternate parent node P' (TPP') and from the alternate parent node P' to the parent node (TP'P) such that TP'P is less than TPC and such that TPP' is less than TP'C.

In step 1725, the parent node may then propagate a reply for the time-synchronized path, the reply carrying a total expected delay to reach the target, and the simplified procedure ends in step 1730.

Figure 18A:
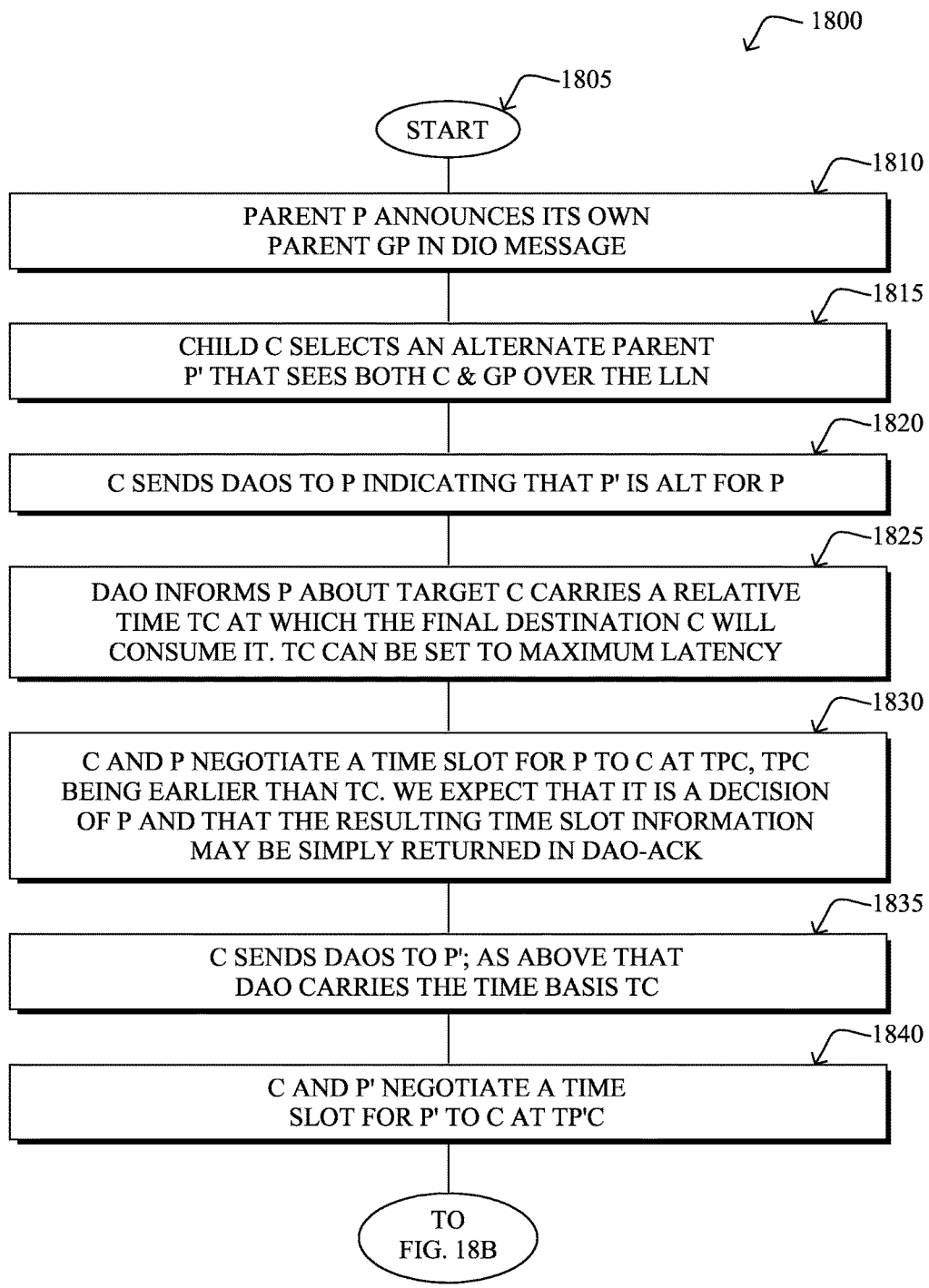
FIGS. 18A-18B illustrate an example simplified procedure for providing for alternate down paths for DAG routing while meeting a time budget.
Figure 18B:
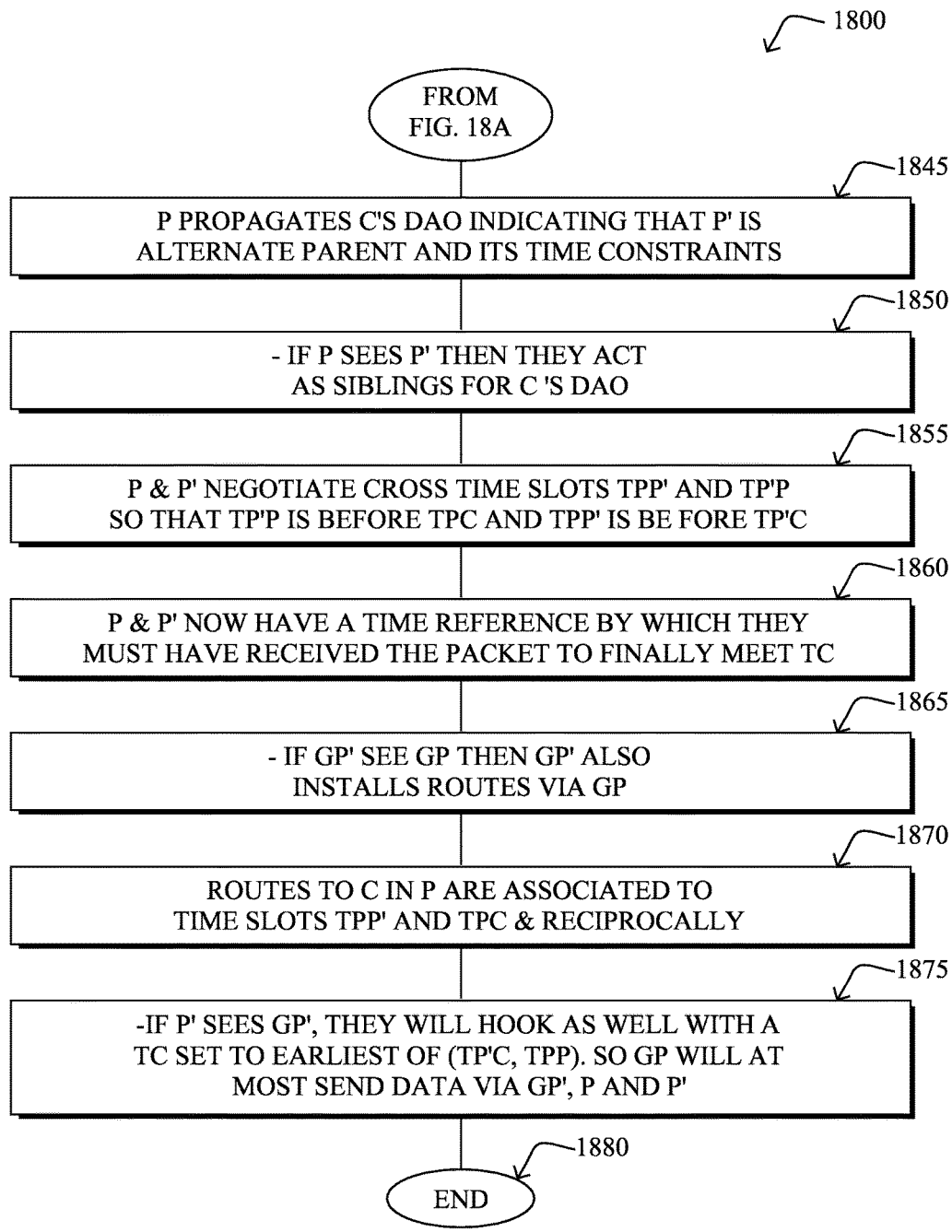

Moreover, with regard specifically to the third aspect of the techniques herein as mentioned above, FIGS. 18A-18B illustrate an example simplified procedure for providing for alternate down paths for DAG routing while meeting a time budget in accordance with one or more embodiments described herein. The procedure 1800 may start at step 1805, and continues to step 1810, where, as described in greater detail above, the parent P announces its own parent GP in DIO message. In step 1815, child C selects an alternate Parent P' that sees both C and GP over the network (e.g., LLN), and in step 1820, sends DAOs to P indicating that P' is alt for P. In step 1825, the DAO informs P about target C carries a relative time TC at which the final destination C will consume it (TC can be set to maximum latency). Also, in step 1830, C and P negotiate a timeslot for P to C at TPC, TPC being earlier than TC. As noted above, this may be a decision of P and the resulting timeslot information may be simply returned in a DAO ACK.

In step 1835, C sends DAOs to P; as above that DAO carries the Time basis TC, and in step 1840, C and P' negotiate a timeslot for P' to C at TP'C. Continuing to FIG. 18B, in step 1845 P Propagates C's DAO indicating that P' is alternate parent and its time constraints. If in step 1850 P sees P' then they act as siblings for C's DAO, then in step 1855 P and P' negotiate cross timeslots TPP' and TP'P so that TP'P is before TPC and TPP' is before TP'C. In step 1860, P and P' now have a time reference by which they must have received the packet to finally meet TC. If in step 1865 GP' sees GP, then GP' also installs routes via GP. In step 1870, routes to C in P are associated to timeslots TPP' and TPC (and reciprocally). In step 1875, if P' sees GP, they will hook as well with a TC set to earliest of (TPC, TPP). So GP will at most send data via GP', P and P. As noted above, in the general case, the TC passed to any node's parent is the earlier time at which a node will need to forward to C via any of its three potential next hops, its sibling, and the two children, and the TC passed to the sibling is the earlier time at which a node will need to forward to C via any of the two children. The procedure may end in step 1880.

It should be noted that while certain steps within procedures 1600-1800 may be optional as described above, the steps shown in FIGS. 16-18B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1600-1800 are described separately, certain steps from each procedure may be incorporated into each other procedure, and the procedures are not meant to be mutually exclusive.

The techniques described herein, therefore, provide for timeslot distribution in a distributed routing protocol in a shared-media communication network, particularly for deterministic wireless networks. Notably, the techniques herein piggyback the timeslot allocation protocol with the route allocation, which saves energy and allows for correlating which slots are for which route. The techniques herein thus allow performing time-based routing using a distributed routing protocol. Also, the techniques herein may be used to establish primary and backup time-synchronized paths that each meets the time budget, while not conflicting timeslot-wise.

While there have been shown and described illustrative embodiments that provide for timeslot distribution in a distributed routing protocol in a shared-media communication network, it is to be understood that various other adaptations and modifications may be made within the spirit and scope of the embodiments herein. For example, the embodiments have been shown and described herein with relation to deterministic wireless networks. However, the embodiments in their broader sense are not as limited, and may, in fact, be used with other types of shared-media networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   operating, at a particular node, via a distributed routing protocol in a shared-media communication network;
   distributing timeslot allocations using the distributed routing protocol, where the particular node as a parent node allocates a pool of timeslots available to child nodes of the parent node;
   transmitting a request for a time-synchronized path, the request carrying:
      an absolute time of cycle for a message from a source to reach a target, and
      a relative time (TC) initialized to the absolute time and decremented at each hop toward the source; and
   dynamically allocating particular timeslots from the pool to particular child nodes according to particular flows from the source to the target in the shared-media communication network in order to meet a defined maximum delay time budget for a resultant time-synchronized path from the source to the target.

2. The method as in claim 1, further comprising:
   determining a hop-distance (N) of the parent node from a root node of the shared-media communication network; and
   determining the pool of timeslots available to child nodes of the parent node as timeslots that are multiples of an $(N+2)^{th}$ prime number.

3. The method as in claim 1, further comprising:
   determining whether a particular timeslot is empty prior to allocating that particular timeslot.

4. The method as in claim 1, further comprising:
resolving timeslot collisions with another node based on an amount of traffic at the parent node and the other node.

5. The method as in claim 4, wherein the amount of traffic is based on a number of child nodes of the parent node and the other node, respectively.

6. The method as in claim 1, further comprising:
receiving link slot information;
determining that a particular remote node is outside an interference range;
allowing use of timeslots associated with the particular remote node within the pool of available timeslots; and
removing the particular remote node from propagated information from the parent node.

7. The method as in claim 1, further comprising:
reserving as many timeslots as are expected to be used prior to actual allocation of the particular timeslots.

8. The method as in claim 1, further comprising:
preventing use of problematic timeslots within the pool of available timeslots.

9. The method as in claim 1, further comprising:
negotiating, with a particular child node, a particular corresponding timeslot to allocate from the parent node to the particular child node such that the particular corresponding timeslot (TPC) is less than TC.

10. The method as in claim 9, wherein the particular child node selects an alternate parent node P' and negotiates with P' a second particular corresponding timeslot TP'C from P' to the particular child node such that the second particular corresponding timeslot (TP'C) is less than TC.

11. The method as in claim 10, further comprising:
negotiating, with the alternate parent node P', a timeslot from the parent node to the alternate parent node P' (TPP') and from the alternate parent node P' to the parent node (TP'P) such that TP'P is less than TPC and such that TPP' is less than TP'C.

12. The method as in claim 1, further comprising:
transmitting a reply for the time-synchronized path, the reply carrying a total expected delay to reach the target.

13. The method as in claim 10, wherein primary and backup time-synchronized paths meet the maximum delay time budget and do not conflict timeslot-wise.

14. An apparatus, comprising:
one or more network interfaces to communicate as a particular node within a shared-media communication network;
a processor coupled to the network interfaces and configured to execute one or more processes; and
a memory configured to store a process executable by the processor, the process when executed operable to:
operate via a distributed routing protocol in the shared-media communication network;
distribute timeslot allocations using the distributed routing protocol, where the particular node as a parent node allocates a pool of timeslots available to child nodes of the parent node;
transmit a request for a time-synchronized path, the request carrying:
an absolute time of cycle for a message from a source to reach a target, and
a relative time (TC) initialized to the absolute time and decremented at each hop toward the source; and
dynamically allocate particular timeslots from the pool to particular child nodes according to particular flows from the source to the target in the shared-media communication network in order to meet a defined maximum delay time budget for a resultant time-synchronized path from the source to the target.

15. The apparatus as in claim 14, wherein the process when executed is further operable to:
determine a hop-distance (N) of the parent node from a root node of the shared-media communication network; and
determine the pool of timeslots available to child nodes of the parent node as timeslots that are multiples of an $(N+2)^{th}$ prime number.

16. The apparatus as in claim 14, wherein the process when executed is further operable to:
negotiate, with a particular child node, a particular corresponding timeslot to allocate from the parent node to the particular child node such that the particular corresponding timeslot (TPC) is less than TC.

17. The apparatus as in claim 14, wherein primary and backup time-synchronized paths meet the maximum delay time budget and do not conflict timeslot-wise.

18. A tangible, non-transitory, computer-readable media having software encoded thereon, the software when executed by a processor operable to:
operate, at a particular node, via a distributed routing protocol in a shared-media communication network;
distribute timeslot allocations using the distributed routing protocol, where the particular node as a parent node allocates a pool of timeslots available to child nodes of the parent node;
transmit a request for a time-synchronized path, the request carrying:
an absolute time of cycle for a message from a source to reach a target, and
a relative time (TC) initialized to the absolute time and decremented at each hop toward the source; and
dynamically allocate particular timeslots from the pool to particular child nodes according to particular flows from a source to a target in the shared-media communication network in order to meet a defined maximum delay time budget for a resultant time-synchronized path from the source to the target.

19. The tangible, non-transitory, computer-readable media as in claim 18, wherein the process when executed is further operable to:
determine a hop-distance (N) of the parent node from a root node of the shared-media communication network; and
determine the pool of timeslots available to child nodes of the parent node as timeslots that are multiples of an $(N+2)^{th}$ prime number.

20. The tangible, non-transitory, computer-readable media as in claim 18, wherein the process when executed is further operable to:
negotiate, with a particular child node, a particular corresponding timeslot to allocate from the parent node to the particular child node such that the particular corresponding timeslot (TPC) is less than TC.

* * * * *